United States Patent [19]
Martin et al.

[11] Patent Number: 5,993,308
[45] Date of Patent: *Nov. 30, 1999

[54] MACHINE FOR EVISCERATING AND DISPLAYING POULTRY FOR INSPECTION

[75] Inventors: Eugene G. Martin, Denver; Duane Newswanger, Conestoga; Scott Cook, Strasburg, all of Pa.

[73] Assignee: Foodcraft Equipment Company, Topeka, Kans.

[*] Notice: This patent issued on a continued prosecution application filed under 37 CFR 1.53(d), and is subject to the twenty year patent term provisions of 35 U.S.C. 154(a)(2).

[21] Appl. No.: 08/717,126

[22] Filed: Sep. 20, 1996

[51] Int. Cl.$^6$ .................................................. A22C 21/00
[52] U.S. Cl. ........................................... 452/177; 452/182
[58] Field of Search .................................... 452/177, 178, 452/182, 66, 179

[56] References Cited

U.S. PATENT DOCUMENTS

| | | |
|---|---|---|
| Re. 21,983 | 12/1941 | Brodeur . |
| Re. 28,666 | 12/1975 | Harben, Jr. . |
| Re. 32,402 | 4/1987 | Graham et al. . |
| 1,798,585 | 3/1931 | Bookheim . |
| 1,837,535 | 12/1931 | Duffey et al. . |
| 1,943,077 | 1/1934 | Jansen . |
| 1,984,562 | 12/1934 | Ashby . |
| 1,986,195 | 1/1935 | Griffin . |
| 2,189,484 | 2/1940 | Brodeur . |
| 2,327,224 | 8/1943 | Spang . |
| 2,381,044 | 8/1945 | Franz . |
| 2,427,840 | 9/1947 | Davis . |
| 2,516,499 | 7/1950 | Albright ................................. 452/177 |
| 2,517,168 | 8/1950 | Bennek . |
| 2,547,608 | 4/1951 | Toti et al. . |
| 2,590,785 | 3/1952 | Nealy . |
| 2,605,496 | 8/1952 | Spang . |
| 2,613,391 | 10/1952 | Still . |
| 2,723,421 | 11/1955 | Smith et al. . |
| 2,738,547 | 3/1956 | Zebarth . |
| 2,774,101 | 12/1956 | Ograbisz . |
| 2,795,815 | 6/1957 | Dahlberg . |
| 2,818,599 | 1/1958 | Howe . |
| 2,830,319 | 4/1958 | Muntz . |
| 2,839,781 | 6/1958 | Jarvis . |
| 2,846,717 | 8/1958 | Patterson et al. . |
| 2,923,028 | 2/1960 | Lundell ................................. 452/177 |
| 2,943,346 | 7/1960 | Jensen . |
| 2,975,469 | 3/1961 | Viscolosi . |
| 2,997,736 | 8/1961 | Ine . |
| 3,042,186 | 7/1962 | Varney . |
| 3,147,513 | 9/1964 | Schneider et al. . |
| 3,230,577 | 1/1966 | Hughes ................................. 452/66 |
| 3,474,492 | 10/1969 | Viscolosi . |
| 3,510,907 | 5/1970 | Rejsa et al. . |
| 3,526,018 | 9/1970 | Lovitt . |
| 3,555,593 | 1/1971 | Scheier . |
| 3,559,233 | 2/1971 | Bottomley et al. . |
| 3,571,844 | 3/1971 | Stiles . |
| 3,605,179 | 9/1971 | Harben, Jr. . |
| 3,634,908 | 1/1972 | Chamberlain . |
| 3,653,093 | 4/1972 | Scheier . |
| 3,663,991 | 5/1972 | Harben, Jr. . |
| 3,685,096 | 8/1972 | Harben, Jr. . .................. Van Mil . |

(List continued on next page.)

FOREIGN PATENT DOCUMENTS 1353396  11/1987  U.S.S.R. ................................. 452/179

*Primary Examiner*—Willis Little
*Attorney, Agent, or Firm*—Panitch Schwarze Jacobs & Nadel, P.C.

[57] ABSTRACT

An apparatus for eviscerating poultry includes plural groups of cars driven around a monorail track by variable pitch augers which produce combined continuous and intermittent car movement. The groups of cars are brought to rest momentarily in front of machinery for performing various operations. At a first station, slaughtered birds are clamped at the shoulders, and brought to a supine position. At a second, the vent of the bird is opened. At a third, the viscera are removed by spoon. Inspectors then examine each bird at a fourth station, and final preparation is performed at a fifth before the birds are unloaded from the apparatus.

4 Claims, 23 Drawing Sheets

OTHER PUBLICATIONS

| | | |
|---|---|---|
| 3,689,961 | 9/1972 | Crane . |
| 3,705,440 | 12/1972 | Lewis . |
| 3,711,897 | 1/1973 | Viscolosi . |
| 3,737,948 | 6/1973 | |
| 3,750,231 | 8/1973 | Schreuder . |
| 3,766,602 | 10/1973 | Bottomley et al. . |
| 3,769,656 | 11/1973 | Jahnke . |
| 3,802,028 | 4/1974 | Scheier et al. . |
| 3,803,669 | 4/1974 | Dillon . |
| 3,806,988 | 4/1974 | Harben, Jr. . |
| 3,834,520 | 9/1974 | Patin ................................ 198/110 |
| 3,837,045 | 9/1974 | Blacker . |
| 3,879,803 | 4/1975 | Verbakel . |
| 3,886,635 | 6/1975 | Meyn . |
| 3,902,221 | 9/1975 | Harben, Jr. et al. . |
| 3,908,229 | 9/1975 | Harben, Jr. et al. . |
| 3,958,302 | 5/1976 | Meyn . |
| 3,958,303 | 5/1976 | Scheier et al. . |
| 3,979,793 | 9/1976 | Hazenbroek . |
| 3,983,601 | 10/1976 | Verbakel . |
| 3,986,231 | 10/1976 | Harben, Jr. . |
| 4,004,320 | 1/1977 | Scheier et al. . |
| 4,019,222 | 4/1977 | Scheier et al. . |
| 4,023,237 | 5/1977 | Meyn . |
| 4,024,603 | 5/1977 | Harben, Jr. et al. . |
| 4,059,868 | 11/1977 | Meyn . |
| 4,087,886 | 5/1978 | Aubert . |
| 4,090,275 | 5/1978 | Jorgensen et al. ................ 452/182 |
| 4,097,960 | 7/1978 | Graham et al. . |
| 4,106,161 | 8/1978 | Niccolls . |
| 4,117,570 | 10/1978 | Meyn . |
| 4,118,829 | 10/1978 | Harben, Jr. . |
| 4,131,973 | 1/1979 | Verbakel . |
| 4,136,421 | 1/1979 | Scheier et al. . |
| 4,153,972 | 5/1979 | Harben et al. . |
| 4,155,146 | 5/1979 | Meyn . |
| 4,178,659 | 12/1979 | Simonds . |
| 4,185,359 | 1/1980 | Niccols . |
| 4,208,764 | 6/1980 | Loth et al. . |
| 4,257,142 | 3/1981 | Hathorn et al. . |
| 4,262,387 | 4/1981 | Scheier et al. . |
| 4,265,001 | 5/1981 | Hathorn et al. . |
| 4,266,322 | 5/1981 | van Mil . |
| 4,270,242 | 6/1981 | Loth et al. . |
| 4,283,813 | 8/1981 | House . |
| 4,325,165 | 4/1982 | De Long . |
| 4,339,849 | 7/1982 | van Mil . |
| 4,382,314 | 5/1983 | Graham . |
| 4,418,445 | 12/1983 | Meyn et al. . |
| 4,424,608 | 1/1984 | Martin . |
| 4,467,498 | 8/1984 | Graham et al. . |
| 4,467,500 | 8/1984 | Olson . |
| 4,477,942 | 10/1984 | Martin et al. . |
| 4,480,353 | 11/1984 | Martin et al. . |
| 4,486,920 | 12/1984 | Tieleman et al. . |
| 4,503,587 | 3/1985 | Martin . |
| 4,516,290 | 5/1985 | van Mil . |
| 4,527,304 | 7/1985 | Ullum . |
| 4,550,473 | 11/1985 | Simmons . |
| 4,557,016 | 12/1985 | Markert . |
| 4,561,148 | 12/1985 | Bonuchi et al. . |
| 4,563,791 | 1/1986 | Martin et al. . |
| 4,564,977 | 1/1986 | Scheier et al. . |
| 4,570,295 | 2/1986 | van Mil . |
| 4,574,427 | 3/1986 | Harben, Jr. et al. . |
| 4,575,901 | 3/1986 | Lerner . |
| 4,587,690 | 5/1986 | Kress . |
| 4,593,435 | 6/1986 | Martin et al. . |
| 4,597,133 | 7/1986 | van de Nieuwelaar . |
| 4,602,403 | 7/1986 | Martin . |
| 4,610,050 | 9/1986 | Tieleman et al. . |
| 4,616,380 | 10/1986 | Tieleman . |
| 4,677,709 | 7/1987 | Dixon . |
| 4,704,768 | 11/1987 | Hutting et al. . |
| 4,723,340 | 2/1988 | Markert . |
| 4,724,581 | 2/1988 | van de Nieuwelaar . |
| 4,731,907 | 3/1988 | Tieleman . |
| 4,745,658 | 5/1988 | Lerner . |
| 4,788,749 | 12/1988 | Hazenbroek et al. . |
| 4,856,144 | 8/1989 | de Greef . |
| 4,876,767 | 10/1989 | Harben, III et al. . |
| 4,888,855 | 12/1989 | Haumann et al. ................ 452/66 |
| 4,899,421 | 2/1990 | Van Der Eerden . |
| 4,910,829 | 3/1990 | Simmons . |
| 4,918,787 | 4/1990 | Hazenbroek . |
| 4,928,351 | 5/1990 | van den Nieuwelaar et al. . |
| 4,958,408 | 9/1990 | Meyn . |
| 5,018,928 | 5/1991 | Hartlepp ................ 414/339 |
| 5,026,317 | 6/1991 | Kennedy . |
| 5,041,054 | 8/1991 | van den Nieuwelaar et al. . |
| 5,064,402 | 11/1991 | Koops . |
| 5,098,333 | 3/1992 | Cobb . |
| 5,122,090 | 6/1992 | van de Nieuwelaar et al. . |
| 5,123,871 | 6/1992 | van den Nieuwelaar et al. . |
| 5,133,686 | 7/1992 | van den Nieuwelaar et al. . |
| 5,135,431 | 8/1992 | van den Nieuwelaar et al. . |
| 5,141,471 | 8/1992 | Bekkers . |
| 5,167,568 | 12/1992 | Esbroek et al. . |
| 5,176,562 | 1/1993 | Martin et al. . |
| 5,178,890 | 1/1993 | van den Nieuwelaar et al. . |
| 5,181,878 | 1/1993 | Bekkers . |
| 5,186,679 | 2/1993 | Meyn . |
| 5,199,922 | 4/1993 | Korenberg et al. . |
| 5,222,905 | 6/1993 | Van den Nieuwelaar et al. . |
| 5,240,454 | 8/1993 | Martin et al. . |
| 5,251,563 | 10/1993 | Staehs et al. ................ 104/168 |
| 5,279,517 | 1/1994 | Koops . |
| 5,299,975 | 4/1994 | Meyn ................ 452/182 |
| 5,306,203 | 4/1994 | Martin et al. . |
| 5,346,427 | 9/1994 | Clark . |
| 5,374,214 | 12/1994 | Martin et al. . |
| 5,425,668 | 6/1995 | Martin et al. . |
| 5,466,185 | 11/1995 | Martin et al. . |
| 5,484,333 | 1/1996 | Martin et al. . |
| 5,499,390 | 3/1996 | Van Ochten et al. . |
| 5,549,521 | 8/1996 | van den Nieuwelaar et al. . |
| 5,580,304 | 12/1996 | Bleth et al. . |
| 5,679,069 | 10/1997 | Van Ochten . |

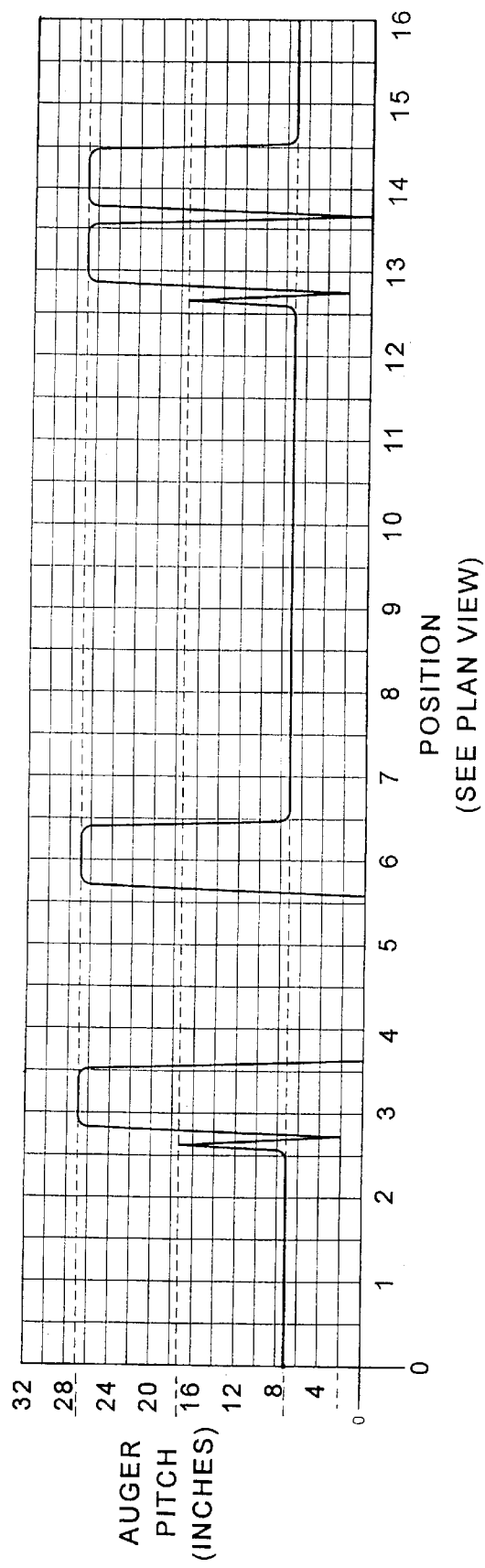

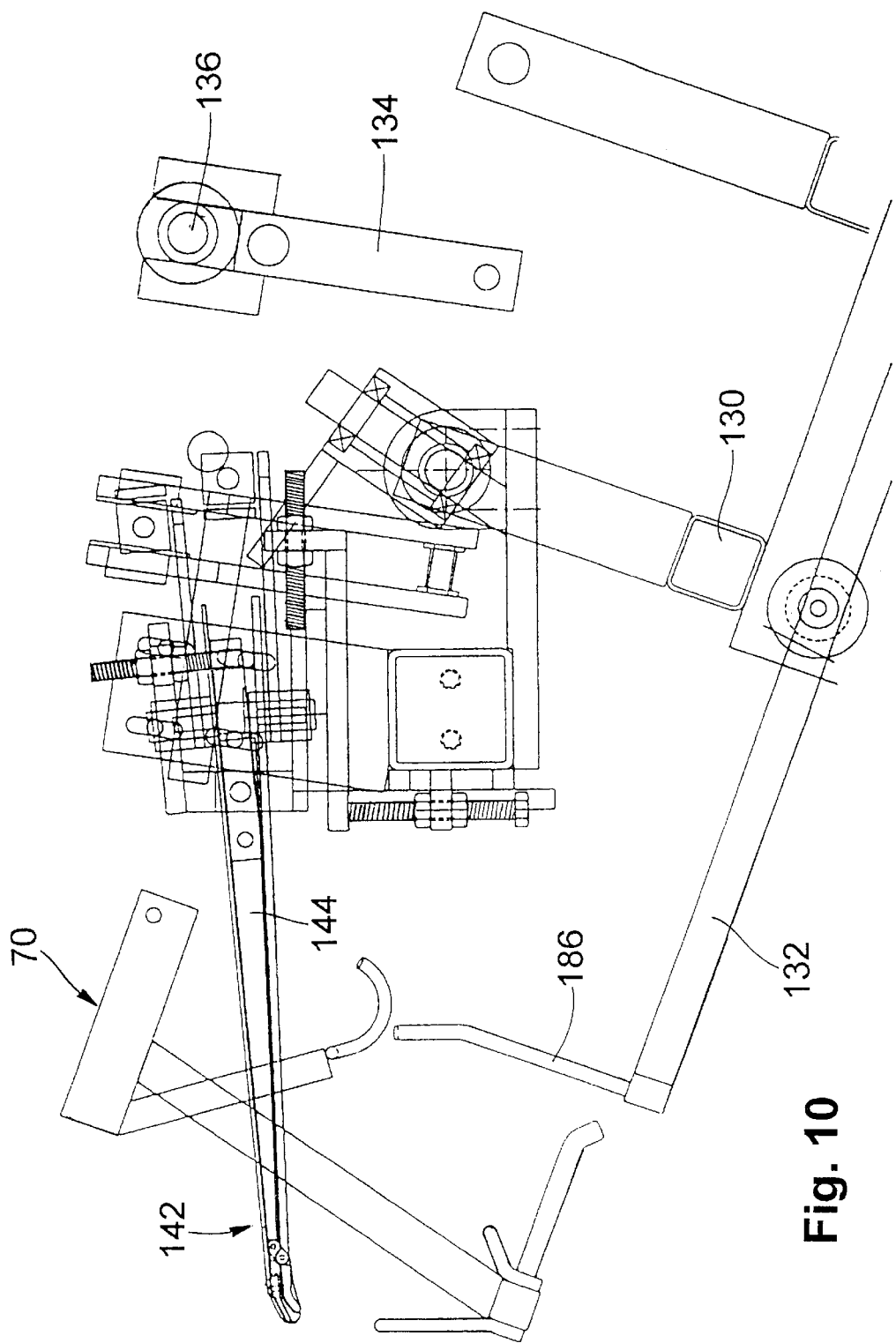

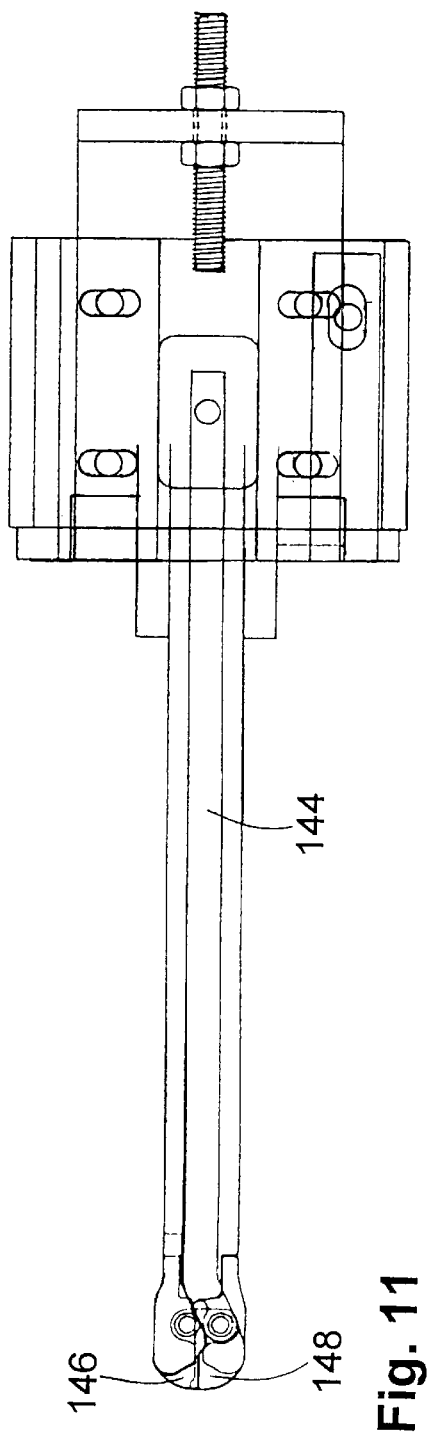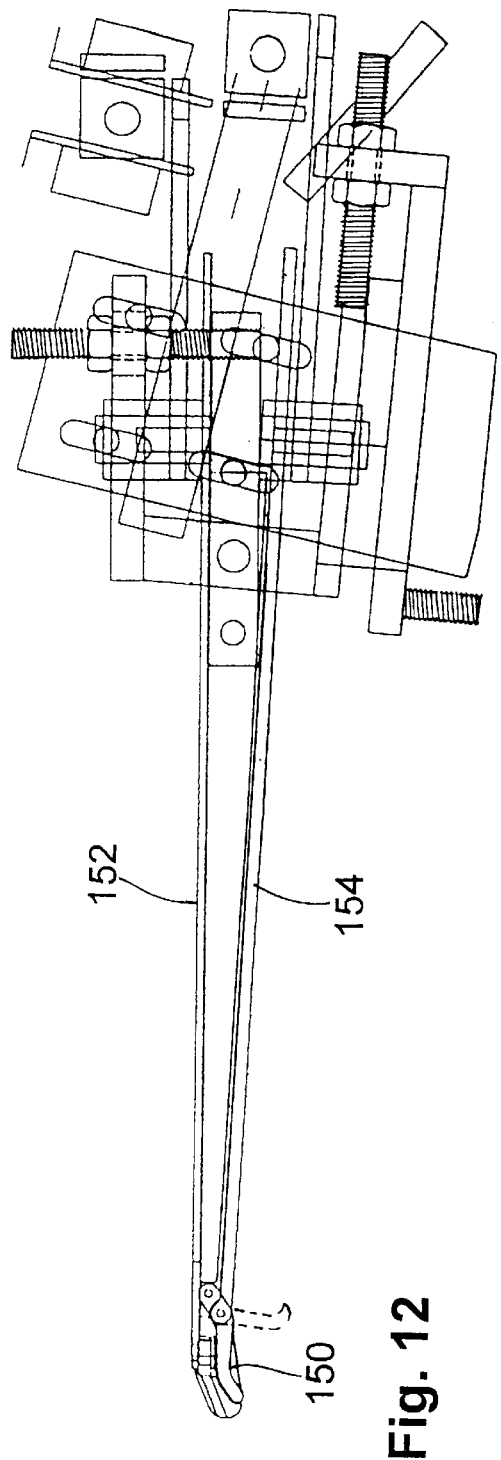

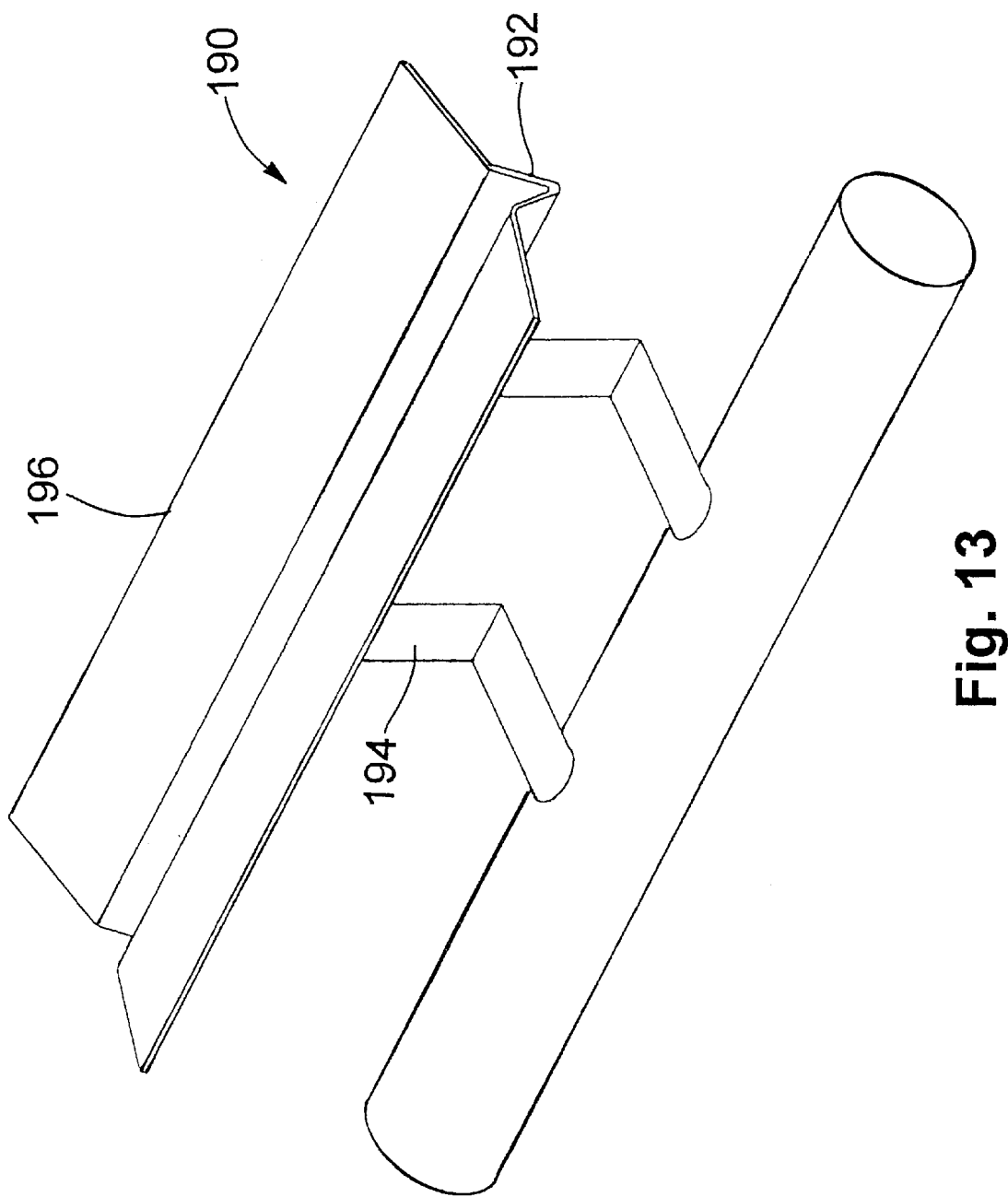

MACHINE FOR EVISCERATING AND DISPLAYING POULTRY FOR INSPECTION

BACKGROUND OF THE INVENTION

This invention relates generally to butchering, and more particularly to a machine for eviscerating poultry. Until fairly recently, poultry was eviscerated by hand. But growing labor costs, concerns over worker health, and the desire to minimize product contamination have by now made evisceration a job done primarily by machinery. The machines mimic what workers used to do: open the body of the bird at the vent without cutting the intestine (to avoid fecal contamination), then pull out the intestines, stomach and other internal organs through the opening. Certain organs—specifically, the heart, spleen, liver and gizzard—must remain associated with the carcass until it is inspected, because they may display signs of poor health, and because some may be included, with the neck, as giblets with the final product.

Every chicken produced in the U.S. is required to be visually inspected by a USDA inspector. At thirty-five birds or more per minute, the inspector's job is tedious and repetitious. Inspectors, like other workers, are subject to repetitive motion injuries, as they must manipulate the birds to get a good look at the interior of the body cavity and the organs. Inspection also is a limitation on line speed. It would therefore be beneficial to improve the way in which each bird is displayed to the inspector, and thus simplify his job by reducing or eliminating his need to handle the product.

SUMMARY OF THE INVENTION

An object of the invention is to provide for fully automated evisceration of poultry.

Another object of the invention is to reduce inspector fatigue, and to minimize the inspector's need to handle the poultry.

A further object of the invention is to improve production speed.

Yet another object is to provide a conveyor comprising a series of cars moving in a closed loop, having certain stations at which cars dwell, while the remaining cars move continuously.

These and other objects are attained by an apparatus for eviscerating poultry as described below.

BRIEF DESCRIPTION OF THE DRAWINGS

In the accompanying drawings,

FIG. 10 is a sectional view taken on the line 10—10 in FIG. 1, showing an eviscerator;

FIG. 11 is a top plan view of a portion of the eviscerator;

FIG. 12 is a side elevation thereof;

FIG. 13 is a perspective view of a vacuum device for separating certain organs from the viscera;

DESCRIPTION OF THE PREFERRED EMBODIMENT

Figure 1:
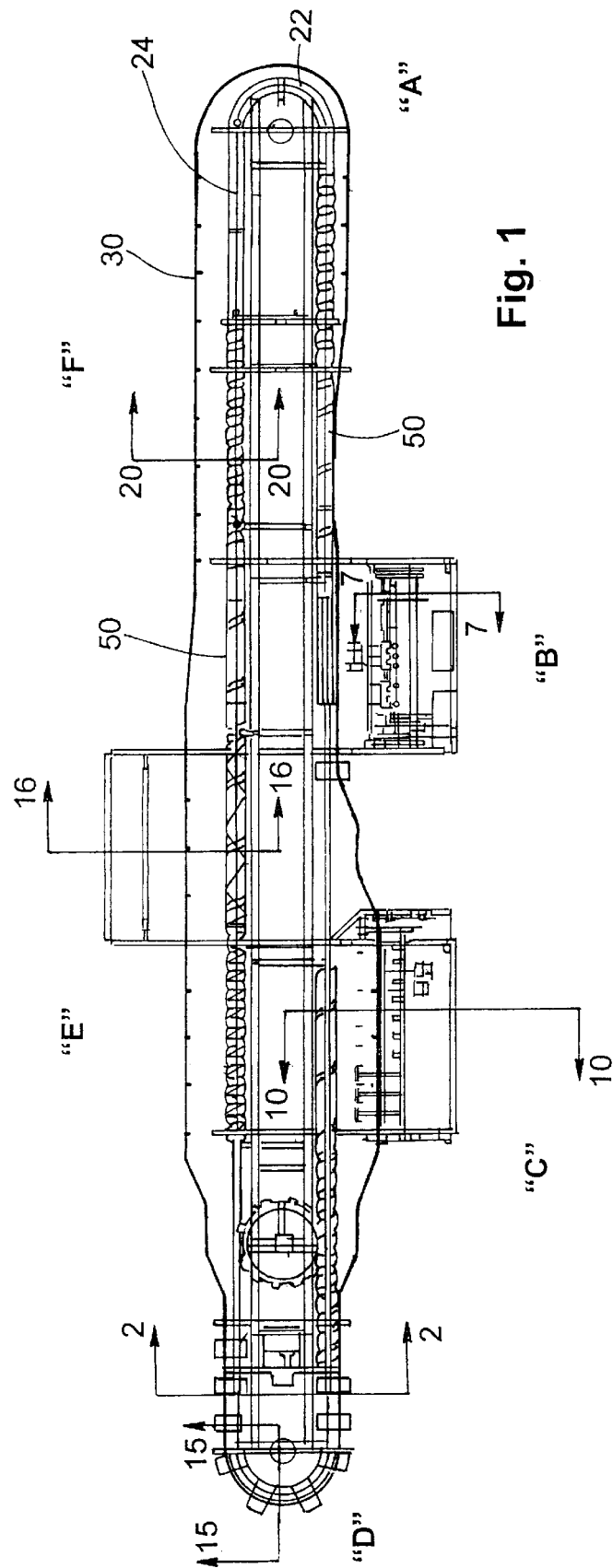
FIG. 1 is a diagrammatic plan view of an apparatus embodying the invention.
Figure 2:
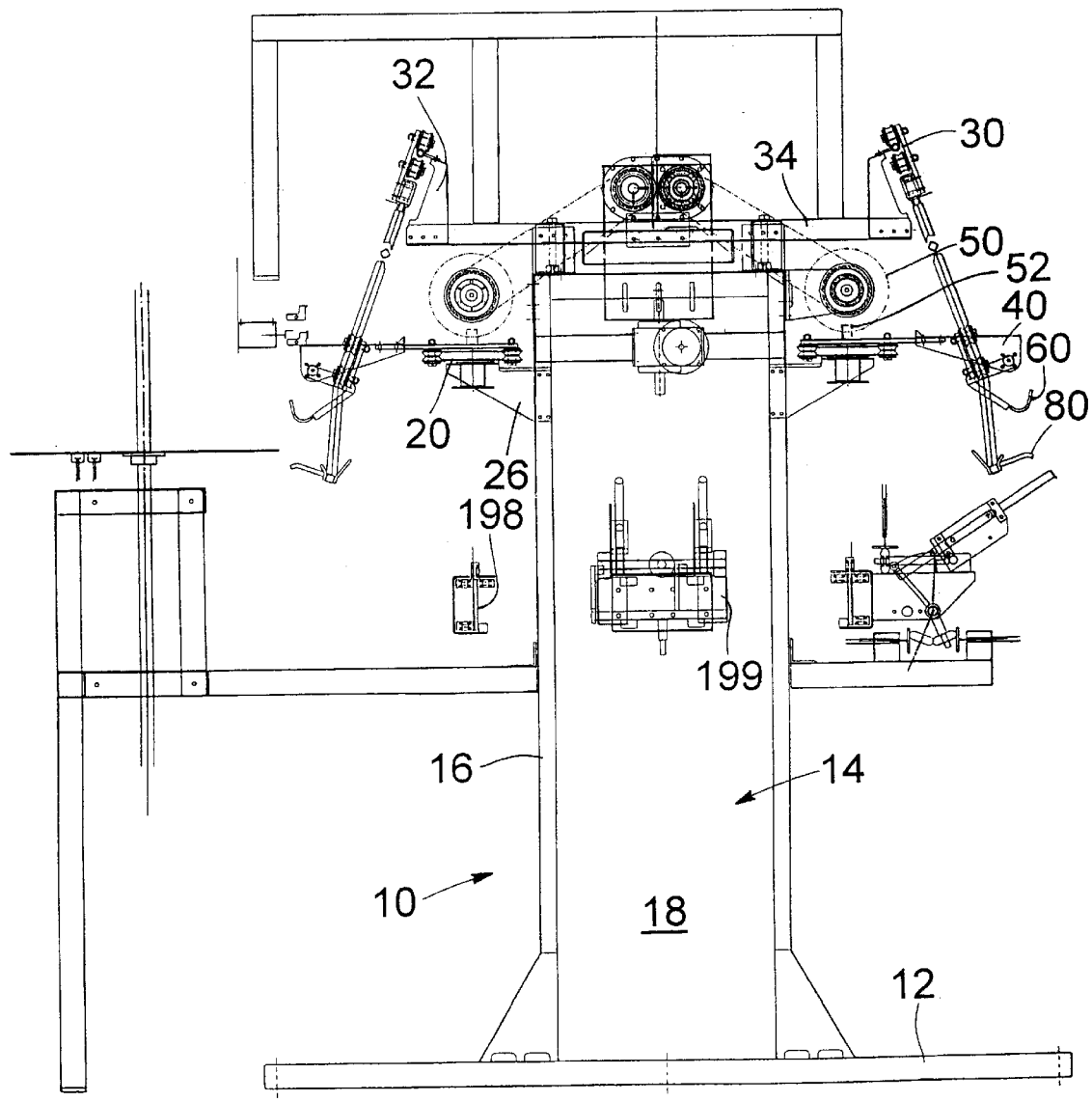
FIG. 2 is a sectional view, taken on the vertical plane 2—2 in FIG. 1.

An apparatus embodying the invention includes a structural frame 10 (FIG. 2) including feet 12 which rest on or are secured to the plant floor, a series of towers 14, each including vertical U-channel members 16 welded to the feet, and lateral spacers 18. The towers are interconnected at least by a primary metal monorail track 20 which is a long oval when viewed from above (FIG. 1). By "oval", we mean oval like a race track, which constant-radius curves 22 interconnected by straight sections 24, not a true ellipse. The towers may also be connected to one another by supplementary longitudinal structural members, not shown. The presently preferred track is made of stainless steel plate one-half inch thick by six inches wide. It is supported on the frame by brackets 26 at intervals sufficiently small to prevent undue flexing of the track under load.

A continuous, generally oval cam rail 30, formed of one-inch rod, is supported at intervals by brackets 32 affixed to cross members 34 at the top of the towers. By "generally oval", we mean the path of the cam rail essentially follows that of the track, except that it deviates in and out, and up and down, from an exact replica of the track path.

The oval primary track 20 passes through a number of stations, identified in the drawings. While the exact layout of stations may be varied, a preferred arrangement is shown in FIG. 1. One end of the oval is a loading station "A"; the opposite end is an inspection station. Between loading and inspection, there is first a vent cutting and opening station "B", followed by an eviscerating station "C". Following an inspection station "D", there is a final preparation station "E" for separating the organ package (heart, liver, spleen and gizzard) from the carcass, and for removing from the body cavity any tissues left after evisceration. Finally birds are removed at an unloading station "F".

Product conveyor

A series of cars 40 ride on the primary monorail track. Each car has a metal body supporting two pairs of plastic wheels having antifriction bearings on respective axles extending from the bottom of the body. The four wheels have V-grooves in their peripheries, and straddle the track, grasping its edges, so that the car cannot pitch or roll.

"Pitch" and "roll" are used in the aeronautical sense to describe rotative movement about longitudinal and transverse horizontal axes of the car.

The cars are pushed through the stations in groups by a two rotating augers 50 above the rail, one on either side of the oval. The last car in each group (e.g., every fifth car) has a roller 52 extending upward into engagement with the flutes of the augers along the straight parts of the oval track. Within each group, the cars are connected to one another by articulated couplers.

Figure 5:
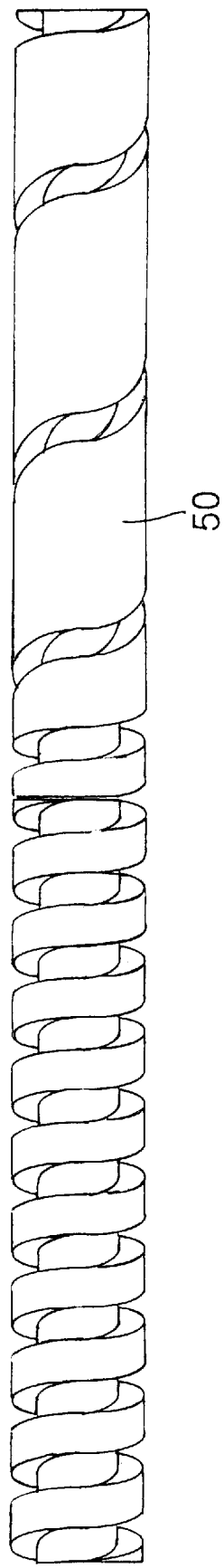
FIG. 5 is a side elevation of a conveyor drive auger having a variable pitch.

The augers turns continuously at constant speed. So, because the pitch of each auger is constant for most of its length, car speed is uniform over most of the track. At some stations, however, the cars must stop while certain operations are performed on the birds. Therefore, the augers have portions with a non-uniform flute pitch (FIG. 5), and the number of cars on the track is made less than the number that would fill it completely, bumper-to-bumper. Only this way can a group of cars be accelerated ahead of the pack, then brought to rest at a processing station while operations are performed, before the rest of the pack catches up with the group cars in the station. In general, car motion is intermittent within certain stations, and continuous everywhere else.

Figure 6A:
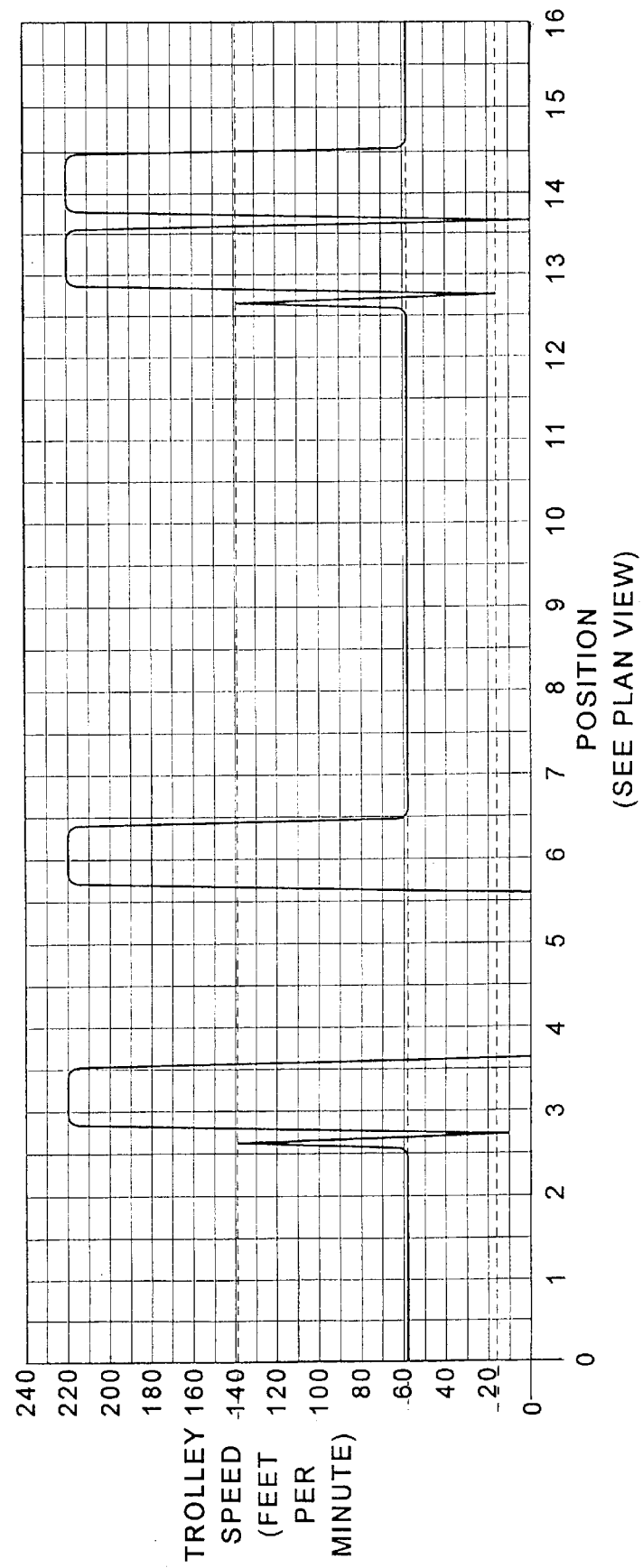
FIGS. 6a–6d are graphs showing car speed, auger pitch, clamp height, and clamp angle as a function of the linear position along the conveyor.

The changes in auger pitch at the processing stations, and the resulting car speeds, are illustrated in the graphs (FIGS. 6a and 6b). One can see between the stations long stretches of constant speed and pitch; approaching a processing station, the cars are accelerated so that they leave the following cars behind, then they are smoothly stopped so that processing may be performed. Once processing is completed at the station, the cars are reaccelerated, then slowed to their original speed. Note that the auger flutes are actually interrupted at points where processing is to take place, so the auger pitch is effectively zero at those points. The cars in the station would remain motionless indefinitely, were it not for the fact that eventually, they are overtaken by the group of cars behind them, which push them forward, reengaging the auger flutes.

The number, size, and grouping of the cars may be varied; however, we prefer to make each car sufficiently long (e.g., twenty inches) to carry two chickens, and to move the cars in groups of five, so that ten chickens at a time are processed at each station, consistent with a production goal of seventy birds per minute.

Product clamping

To hold slaughtered birds as they are carried through the processing stations, each car has two pairs of leg shackles fixed to it. Each shackle includes a pair of metal rods 60 which curve upwardly and have a spacing less than that of the ankle joint ("hock") of a chicken, so that the chicken can be suspended by placing its hocks in between respective pairs of the rods. The chickens may be loaded manually or by machine.

In addition to the static leg shackles, there are also fixed shoulder rests 62, facing downward. The vertical distance between the shackles and the rests is somewhat smaller than the spacing of the corresponding parts on the slaughtered birds, so the rests initially are not engaged.

Figure 3:
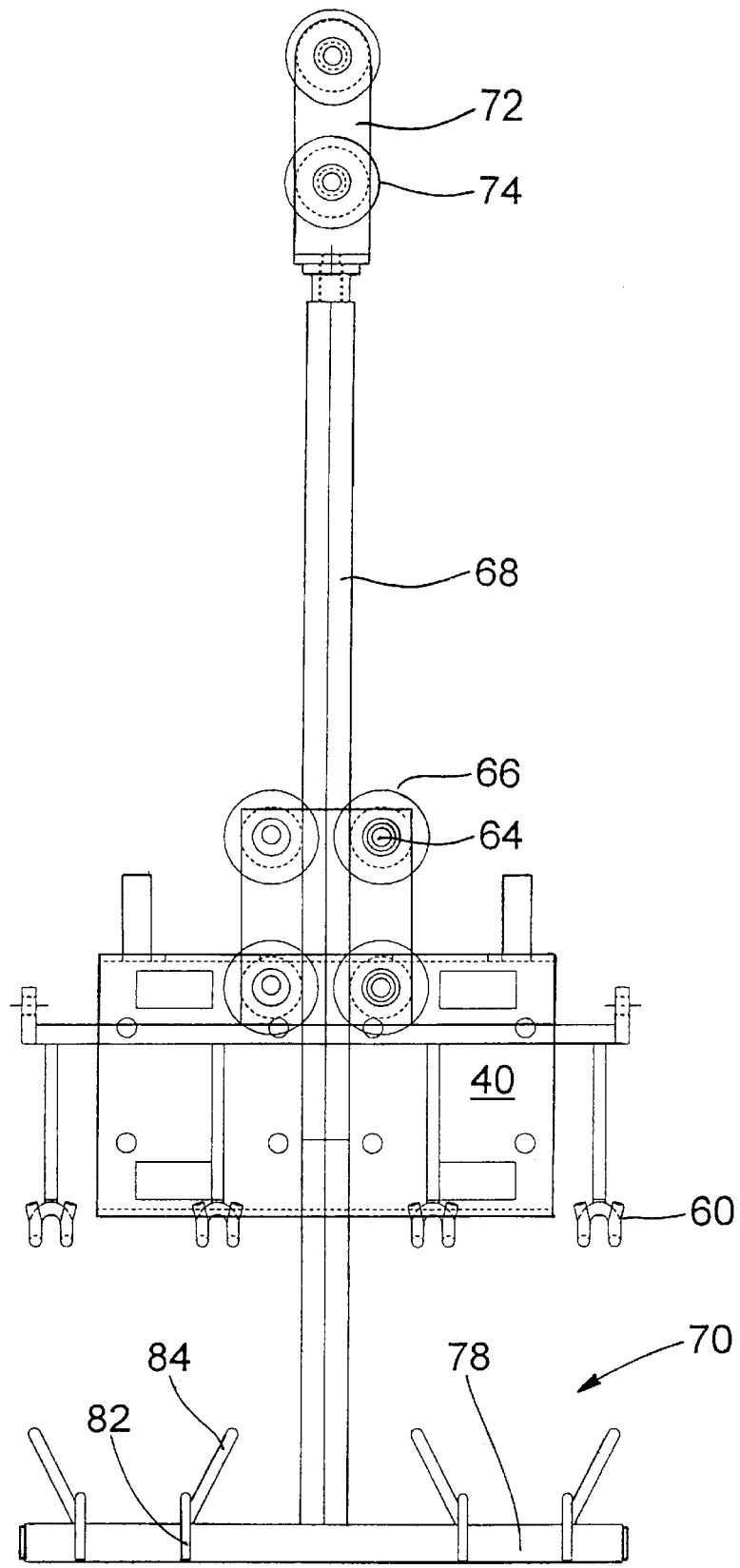
FIG. 3 is a side elevation of the elements shown in FIG. 2, taken in the direction of arrow "3" in FIG. 1.

Each car has stub shafts 64 (FIG. 3) supporting two pairs of wheels 66, each having V-grooves shaped and spaced to act as linear bearings for the one-inch square handle 68 of a back rest and clamp device 70 for supporting and fixing the position and orientation of the body of the chicken. The handle of the clamp lies in a vertical plane bisecting the car lengthwise; within this plane, the attitude of the handle can vary as described below, because the shafts and wheels can pivot with respect to the car.

Figure 4:
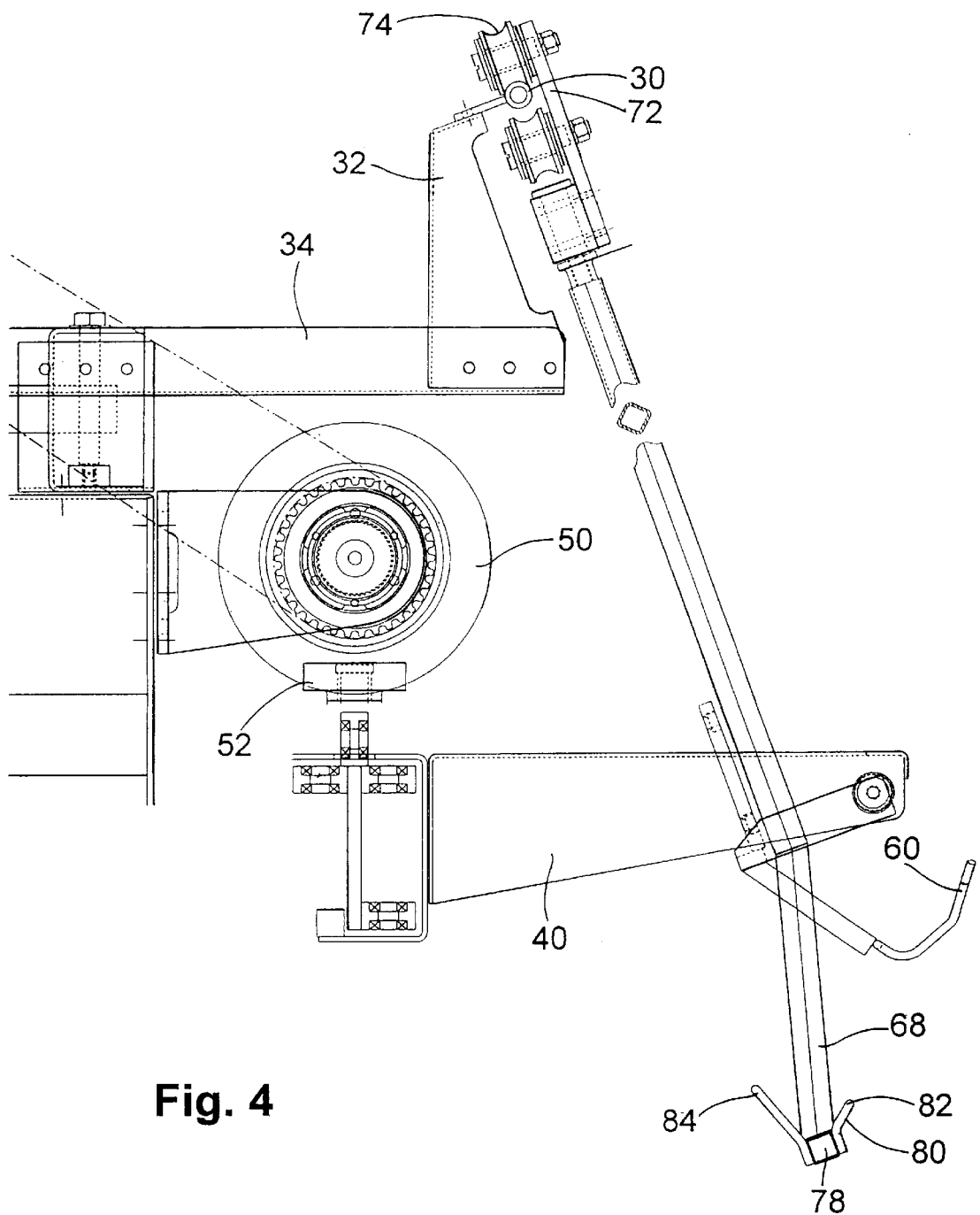
FIG. 4 is an end view of the clamping portion.
Figure 6C:
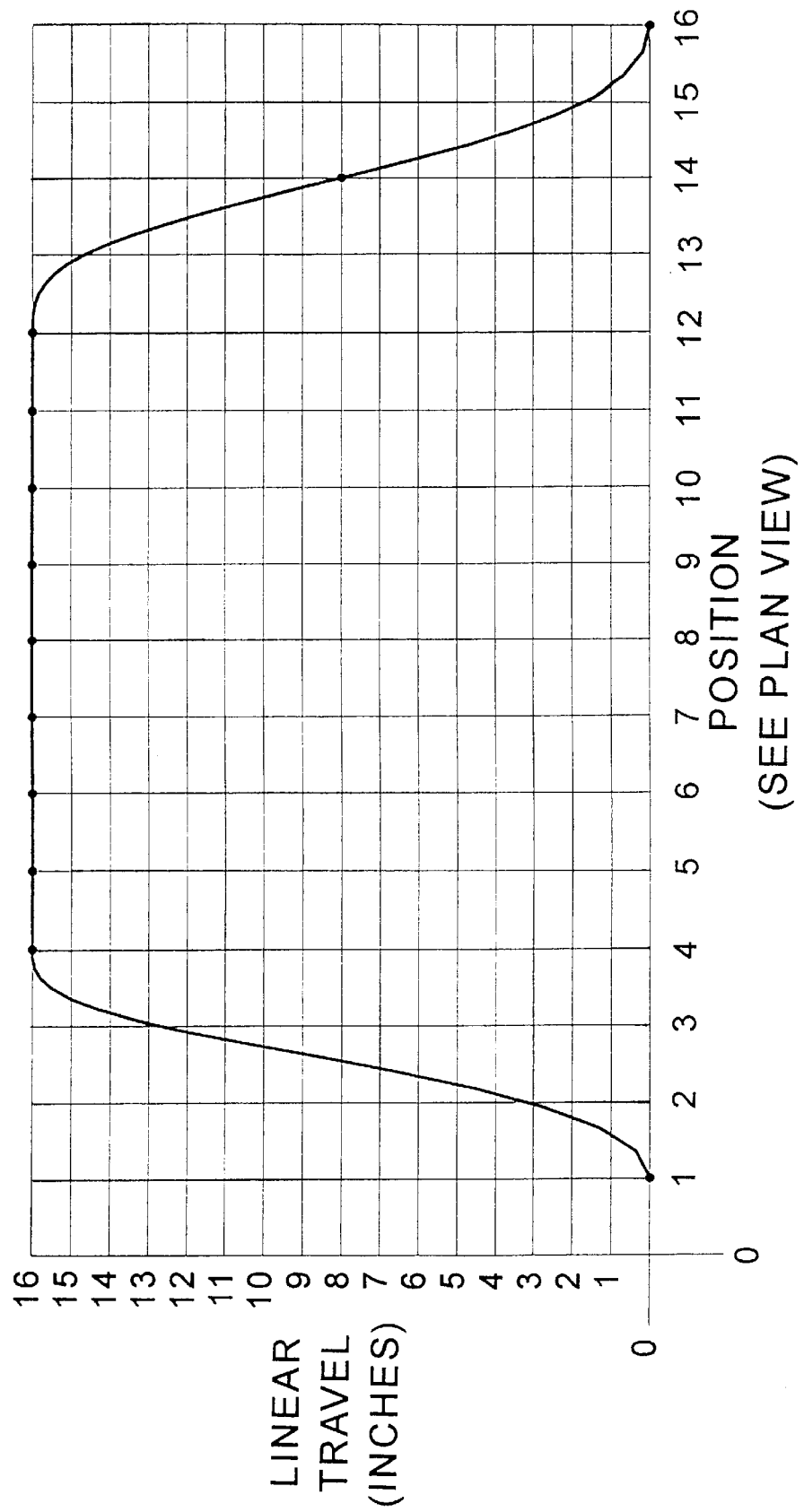
Figure 6D:
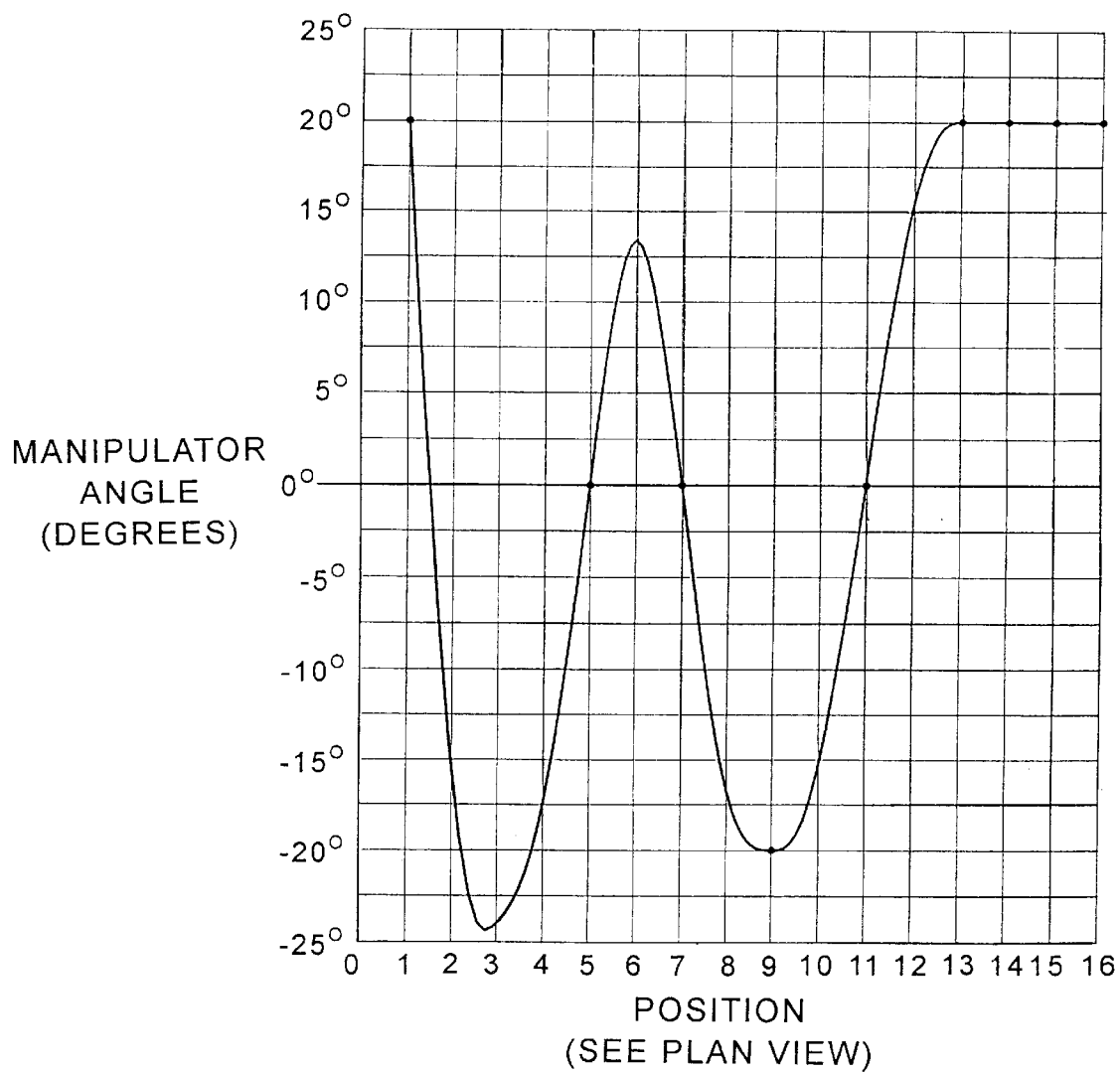
Figure 6E:
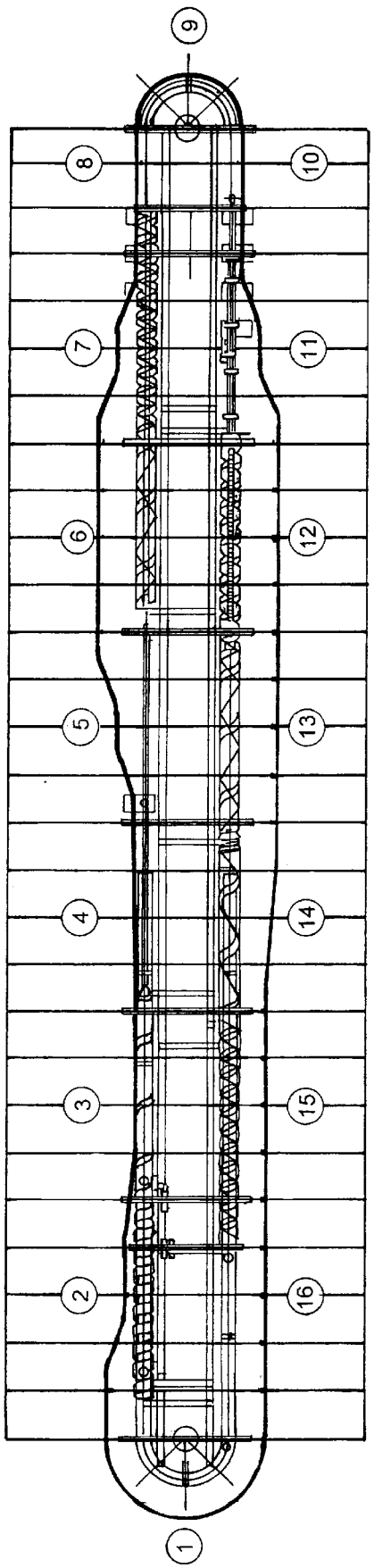
FIG. 6 is a overhead diagram of the apparatus.

At the upper end of each handle, there is a small plate 72 (FIG. 4) supporting a pair of grooved wheels 74 riding on either side of the cam rail 30. As the car moves along the track, the handle pivots in and out (FIG. 6d), and moves up and down (FIG. 6c), according to the configuration of the cam rail. The horizontal axis of the graphs is divided into sixteen increments of arbitrary length, which correspond to the positions shown in FIG. 6e.

The lower end of the clamp includes a horizontal bar 78 welded to the bottom of the handle 68. Two stout backrest rods 80 are welded, about an inch apart, to the bar, extending outward perpendicular to the handle. Outboard of the backrest rods, there are a short pair of hooks 82, for locating over the back side of the shoulders, and a pair of straight rods 84 for engaging the breast side of the shoulders, as described below.

In operation, after a chicken has been loaded into one of the leg shackles at the loading station, the car passes to a clamping station where, owing to the shape of the cam rail, the rest is raised to engage the back of the chicken above it, and reorient it to a reclined or supine position, with the back upon on the backrest rods 80. The neck hangs over the bar 78, and the vent is oriented outward. The shoulders, located by the hooks 82 and straight rods 84, are raised toward the shoulder rests as the handle is lifted further by the cam rail, until the upper joints of the wings (humerus bone, or "drumette") are captured between the bar and the shoulder rests. Now the bird is completely immobilized, and the neck opening position is precisely known. This makes subsequent automatic processing possible.

Vent Opening

Figure 8:
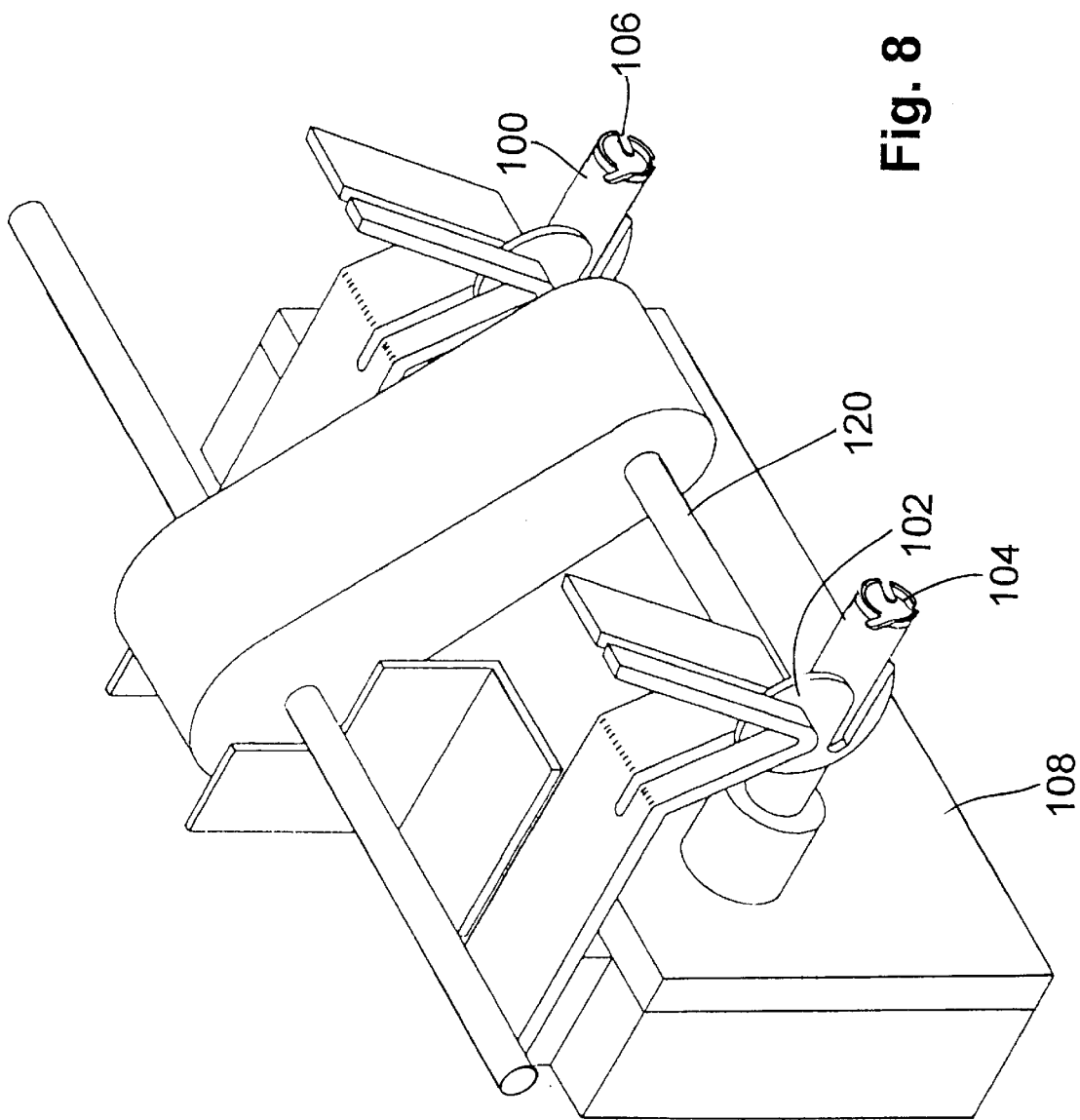
FIG. 8 is a perspective view of a portion of the vent opener.

After the birds are clamped, they are carried to the vent opening station, where the cars dwell for a short time. During this time, the vents are cut and the abdomen is opened by two tools: a vent drill 100 (FIG. 8) which captures the ring muscle and cuts the tissue around it, and spiral blade 102 that enters the vent opening beside the drill, and then cuts through the abdomen skin and fat pad from the inside, forming an opening through which the entrails can subsequently be removed, without cutting the intestines.

Figure 7:
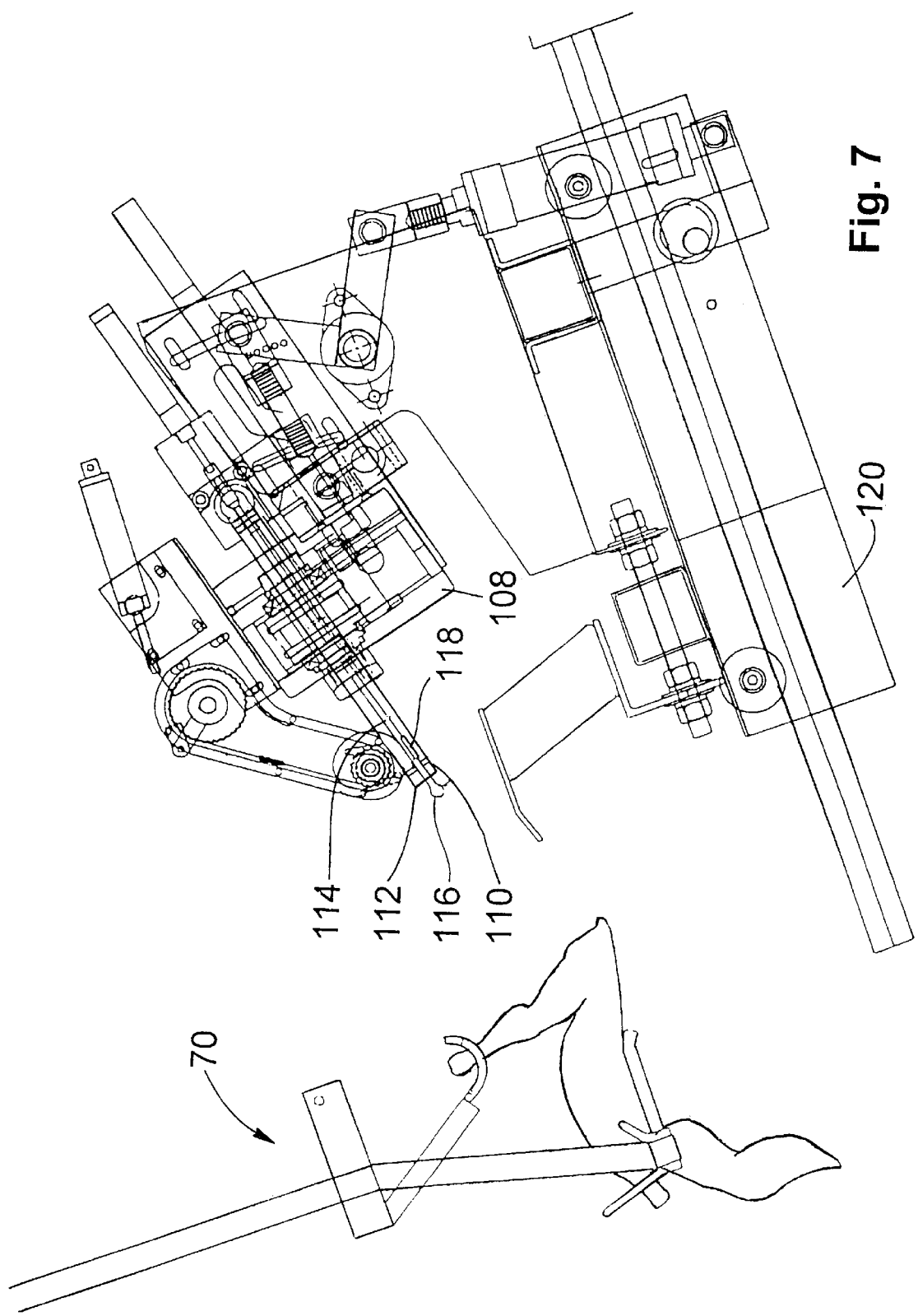
FIG. 7 is a sectional view taken on the line 7—7 in FIG. 1, showing a vent opener and cutter.

The vent drill is a steel tube having a sharp leading edge 104 and four slots 106 defining sharp points. The drill is ordinarily at rest. It is mounted on a transfer case 108 which, on command, rotates the drill. Within the drill is a slide-fit plastic sleeve 110 (FIG. 7) whose interior communicates, via a control valve, with a vacuum source, not shown. The end 112 of the sleeve is open, and can telescope a short distance in and out of the drill. Within the plastic sleeve is a loosely-fitting probe consisting of a small-diameter rod 114, an enlarged tip 116 slightly smaller than the inner diameter of the sleeve, and three vanes 118 some distance behind the tip. The vanes ride on the inside of the sleeve to keep the tip centered. The probe and the sleeve are independently reciprocated by means not shown.

Figure 9:
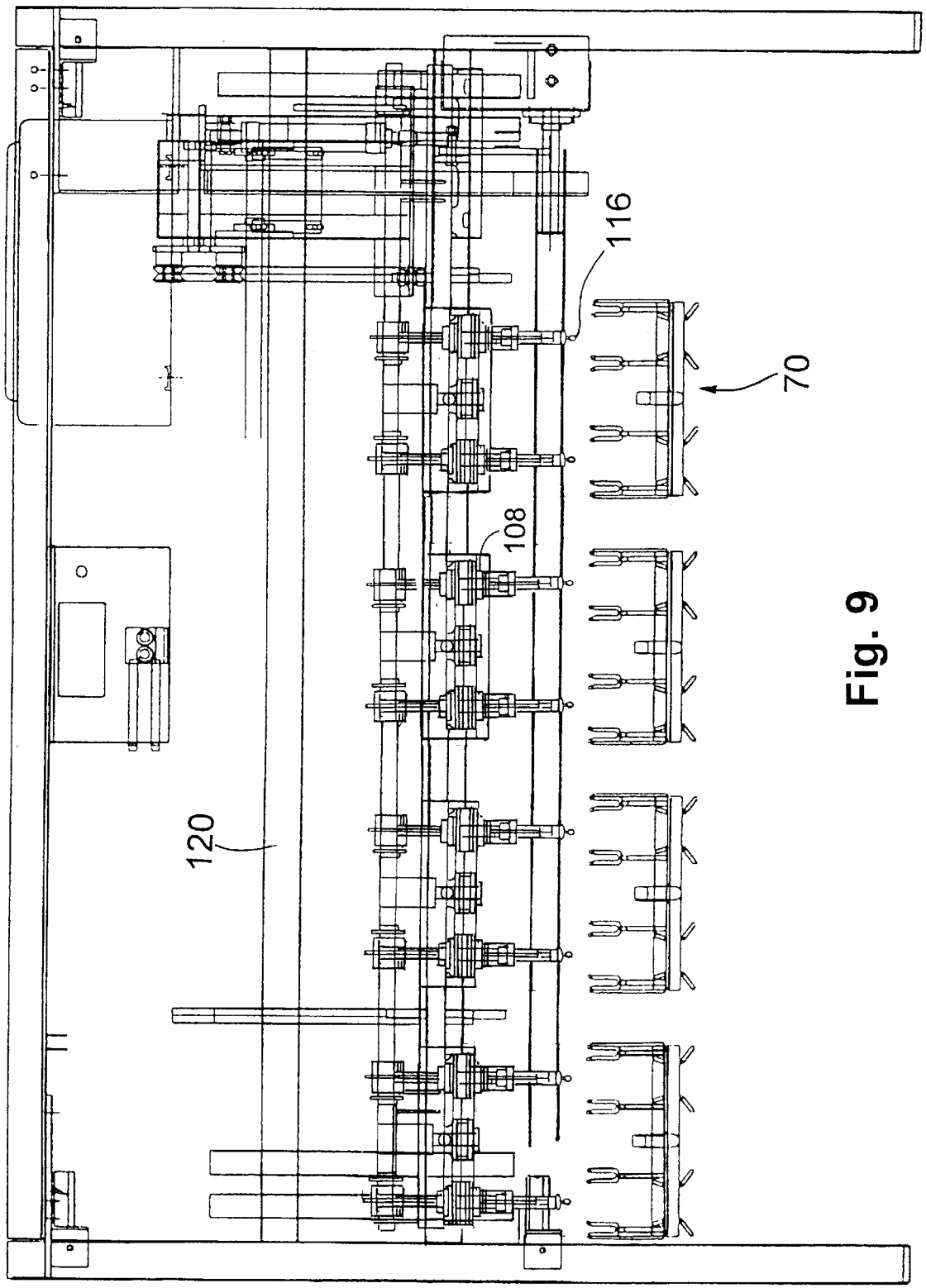
FIG. 9 is a top plan view thereof.
Figure 14:
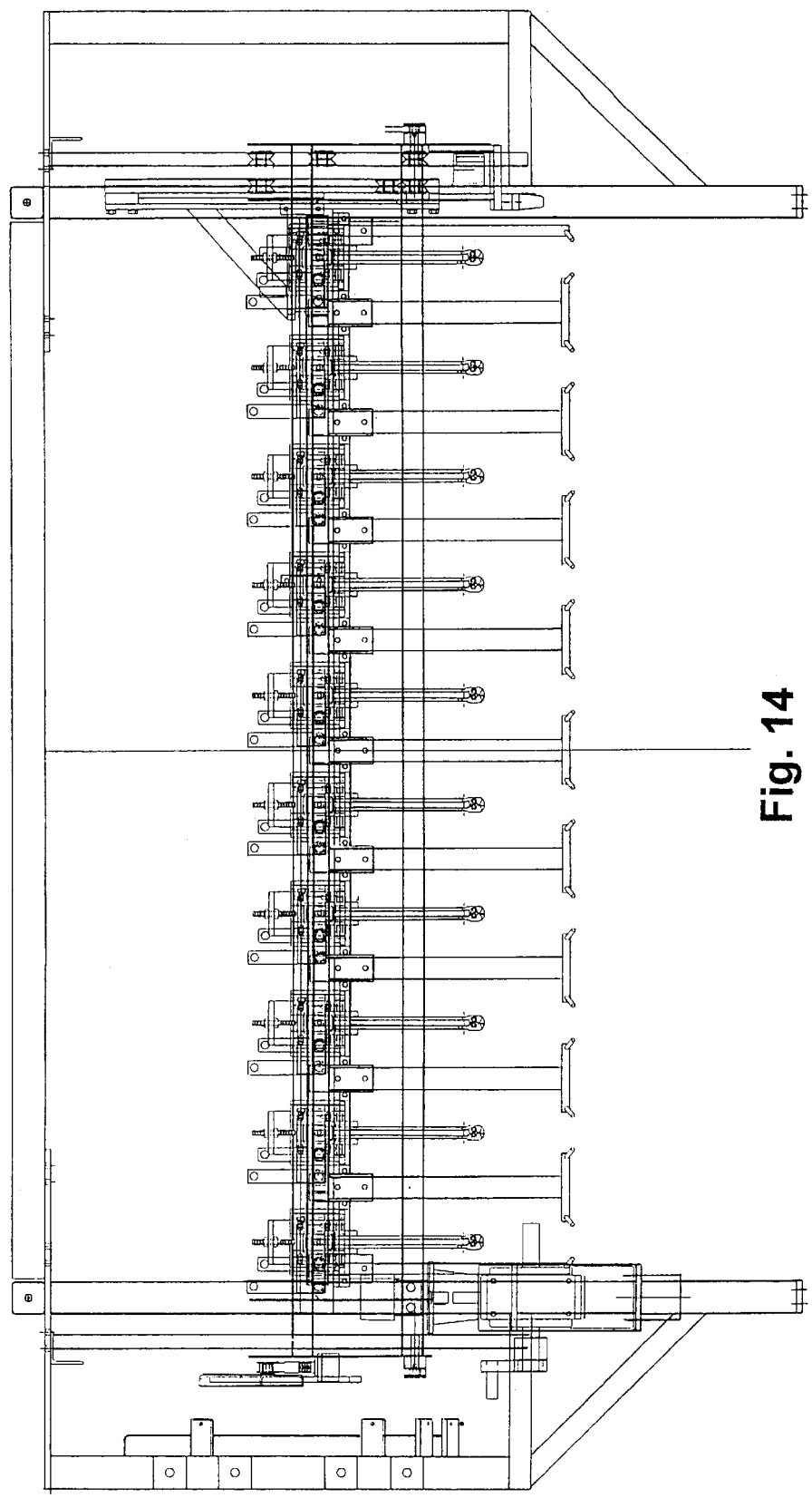
FIG. 14 is a top plan view of the eviscerator.
Figure 15:
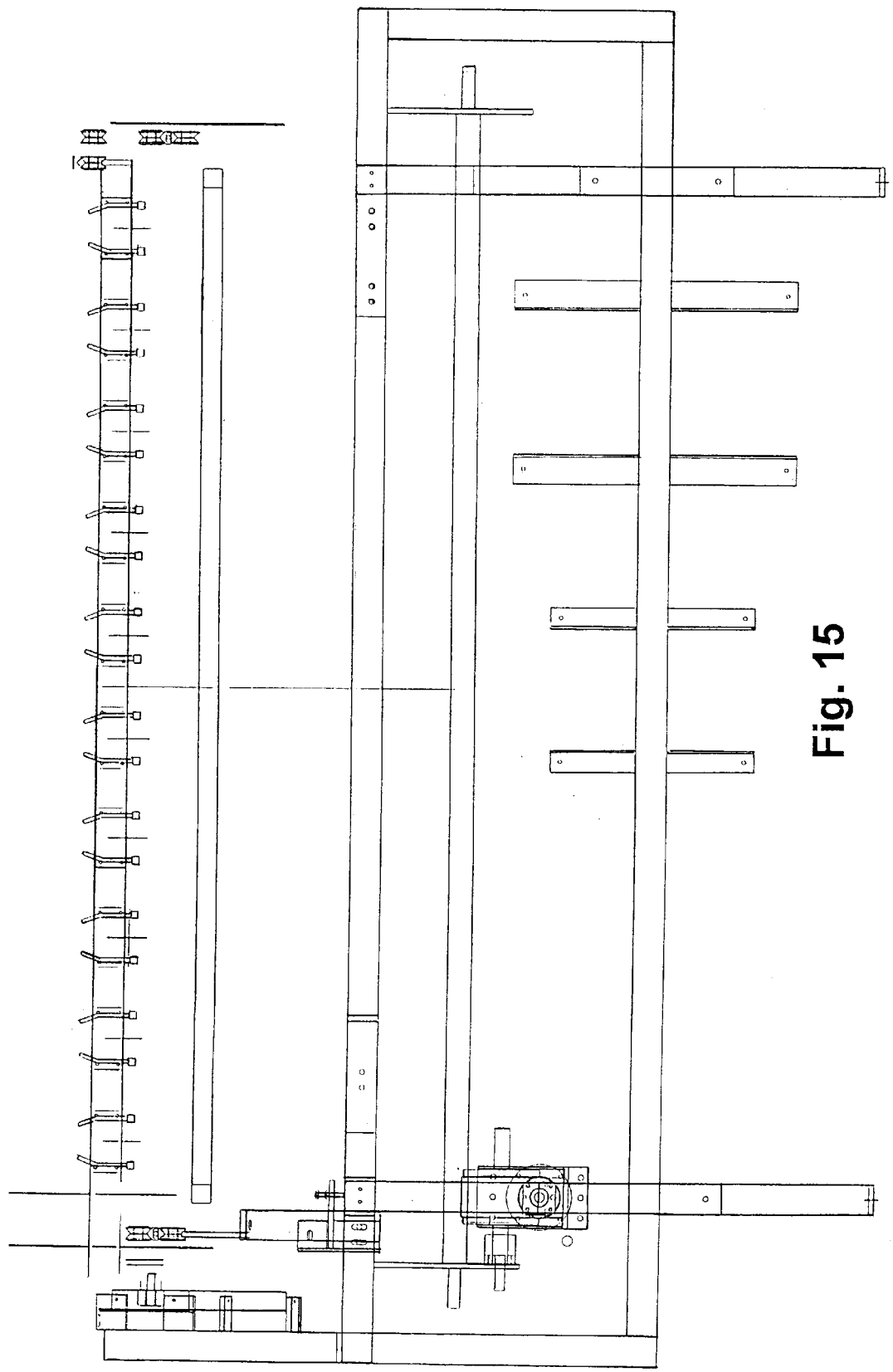
FIG. 15 is a sectional view, taken on the line 15—15 in FIG. 1, showing details of an inspection station.
Figure 16:
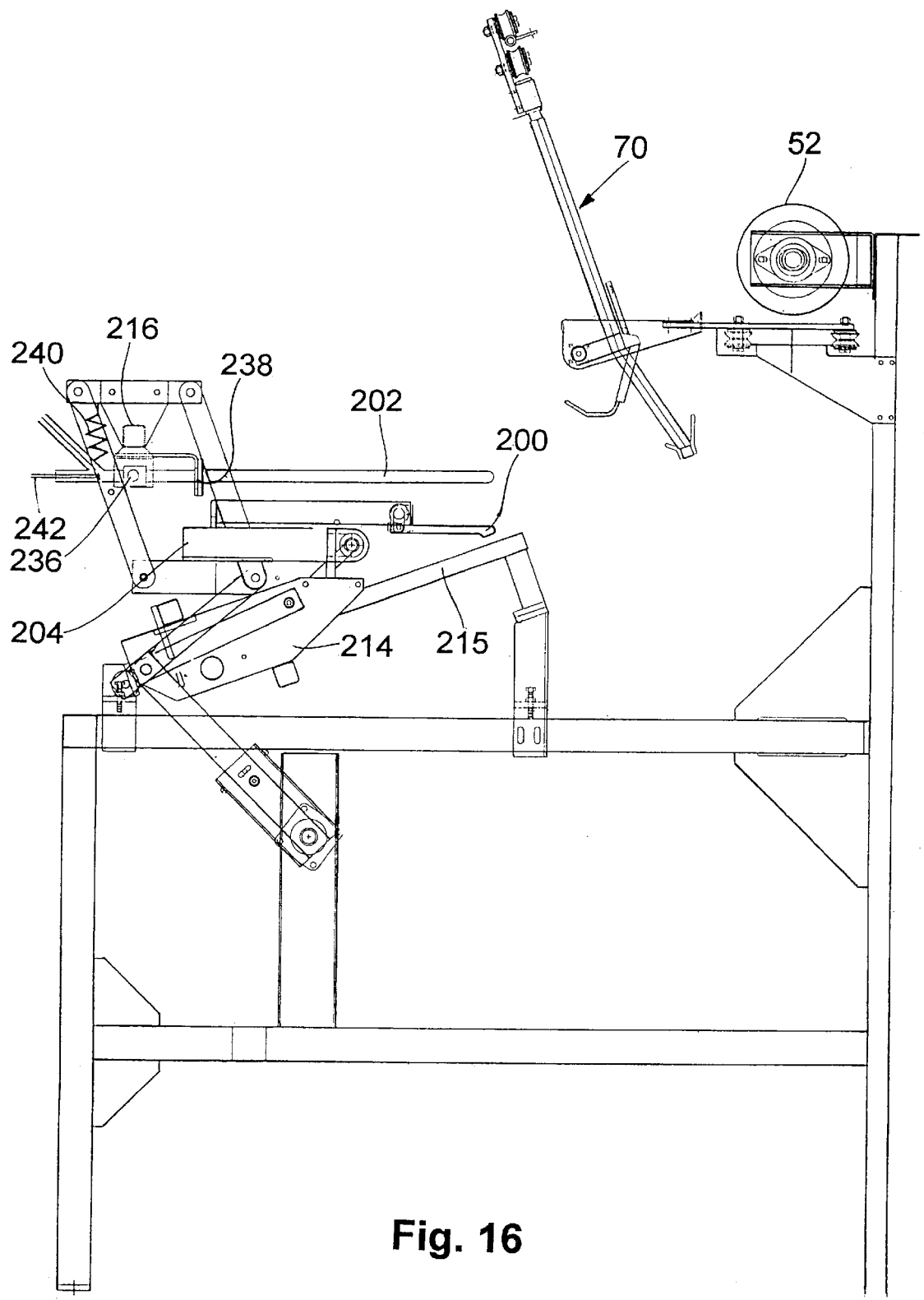
FIG. 16 is a sectional view, taken on the line 16—16 in FIG. 1, showing a final preparation device.
Figure 17:
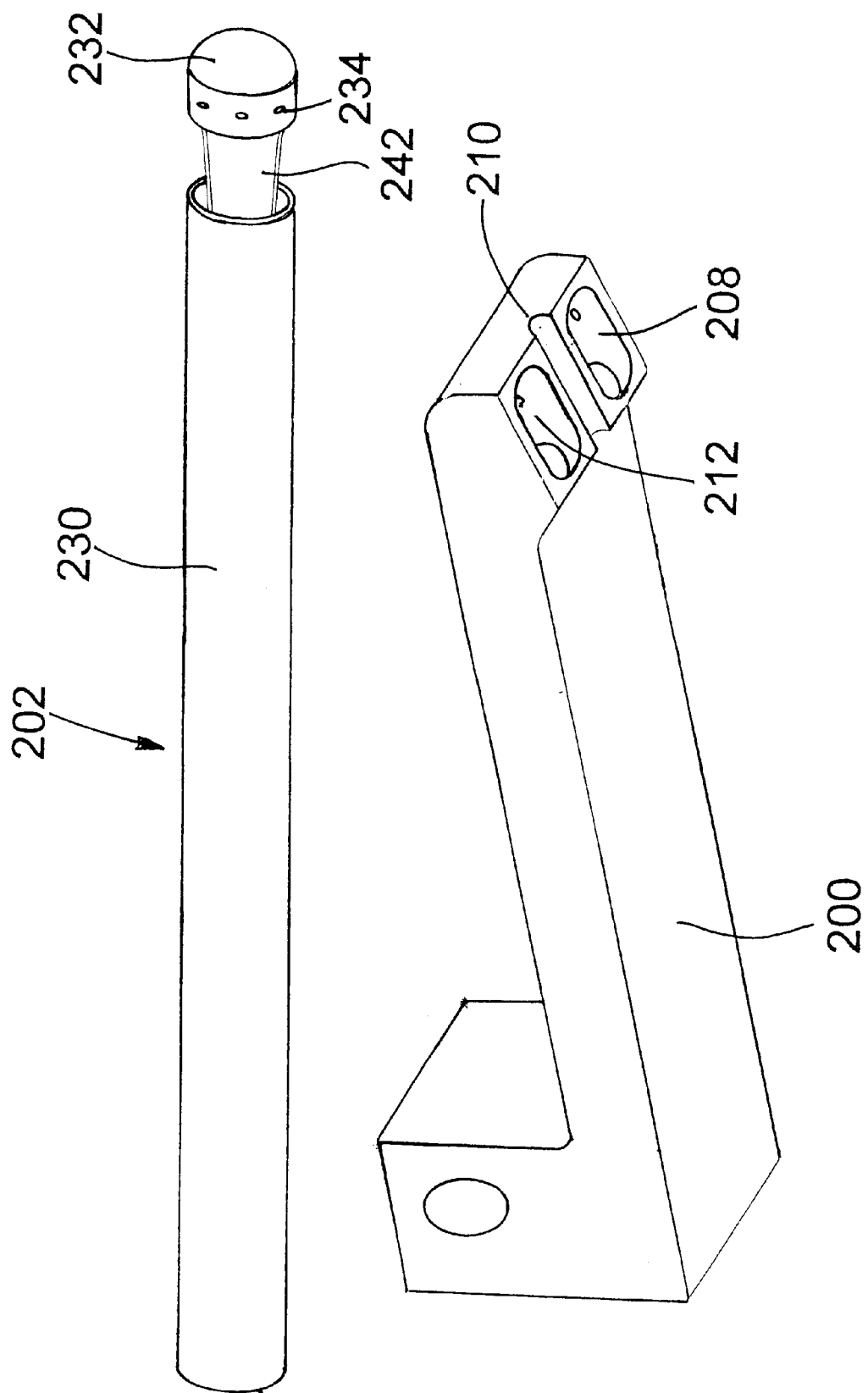
FIG. 17 is a perspective view of a portion of the final preparation device.
Figure 18:
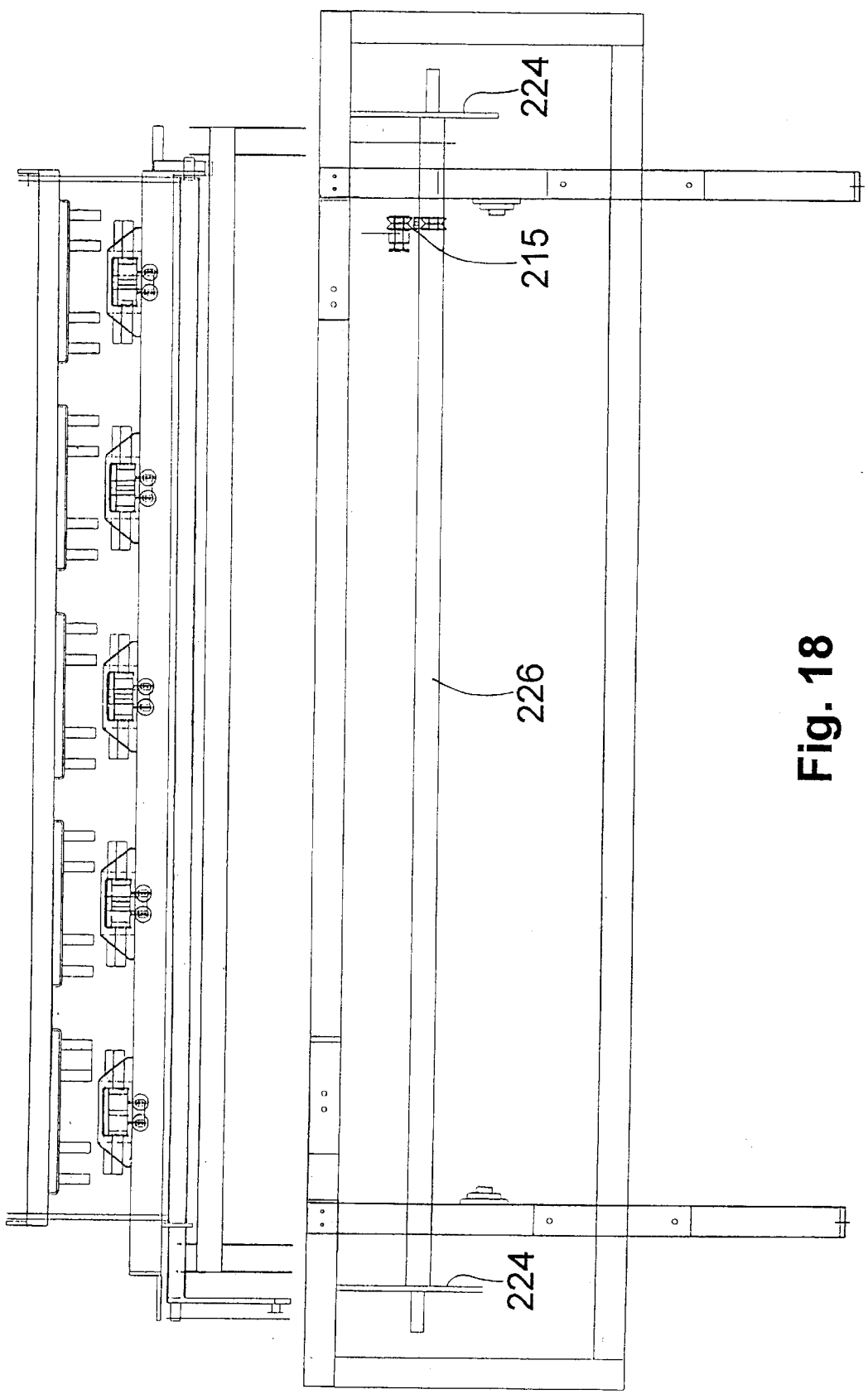
FIG. 18 is a top plan view thereof.
Figure 19:
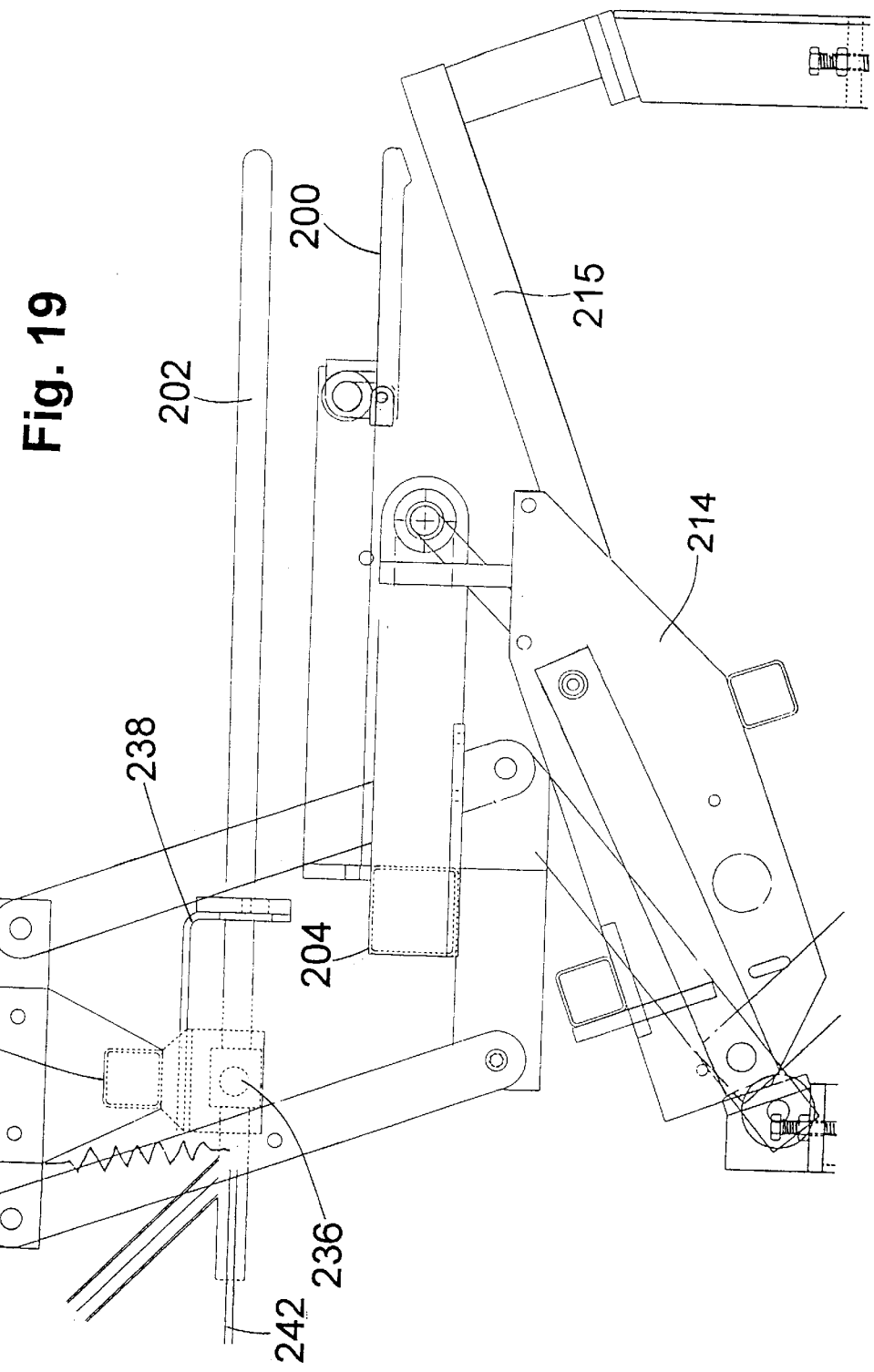
FIG. 19 is a side elevation thereof, showing a movable frame and a pair of relatively moveable beams for supporting parts of the final preparation device.
Figure 20:
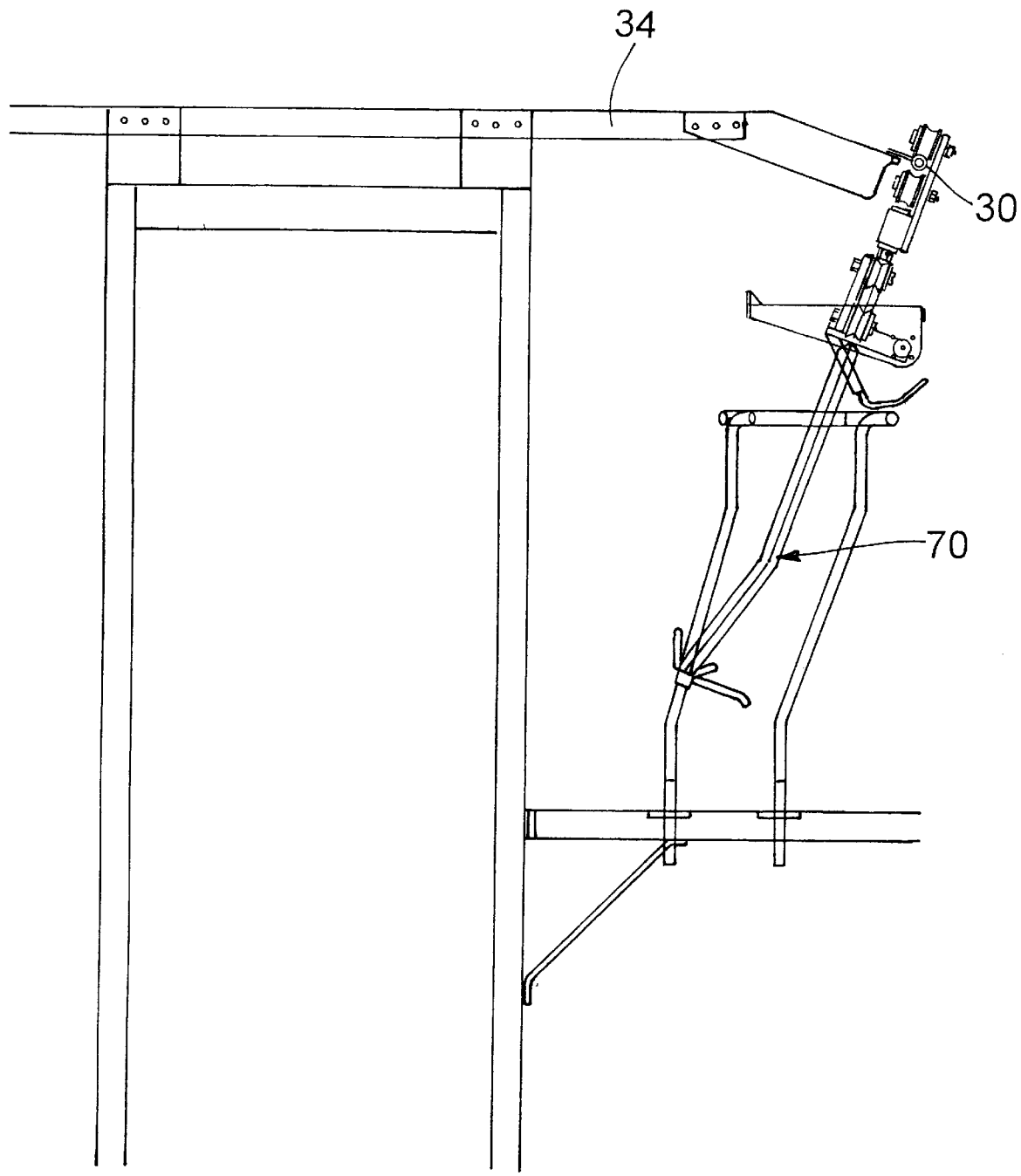
FIG. 20 is a sectional view, taken on the line 20—20 in FIG. 1, showing unloading of the finished product from the clamping device.

To process ten birds at once, ten identical tools as described above are mounted on a common frame 120 (FIG. 9) adapted to move toward and away from the conveyor line.

In operation, the frame is advanced toward the conveyor line so that the tools make contact with the birds which have come to rest in from of the tools. A pair of plates just ahead of the drill define a triangular aperture which receives the tail and thus centers the bird so that the vent is precisely positioned. The probe is inserted into the vent, so that its enlarged tip 116 is behind (inside) the ring muscle. Now, as the sleeve 110 is advanced against the vent, vacuum is applied, to draw the tissues into engagement with the end of the sleeve. Once the ring muscle has been drawn into the mouth of the sleeve, the sleeve is advanced over the tip of the probe, capturing the ring muscle behind the tip and within the sleeve. Now, while the sleeve and probe together are pulled away from the bird, the drill is rotated, cutting the tissue around the ring muscle, and removing the sex organs located between the ring muscle and the spine, and creating an opening into which the spiral blade can enter.

The spiral vent cutting blade 102 is mounted on a horizontal shaft 120 whose axis is perpendicular to that of the vent drill. The position of the blade is just adjacent the cutting end of the drill, so that the tip of the blade can penetrate the tissue as soon as the skin around the vent has been cut. We have found that better performance is obtained when the blade is mounted, as shown, on the side of the drill that results in counter-directional motion between the two. That is, if the drill rotates counterclockwise, the blade should be mounted to its left, tip upward as illustrated, so that the drill tends to push the excess slack skin outside of the blade tip.

In the preferred machine, ten identical vent opener cutters are mounted on a common frame, whose wheels ride on rails so that the frame can be moved inward (toward the birds) to perform their action, then retracted before the birds resume their movement along the conveyor path to the eviscerating station.

Product reorientation

Between the venting station and the eviscerating station, the cam rail above the track bends inward, so that the inclination of the backbone of the bird changes from about 25° inclined to about 20° depressed. That is, the neck is now lower than the vent, an optimum orientation for evisceration.

Evisceration

At the eviscerator, there are ten identical viscera pullers mounted on a common primary frame 130 which rides on rails 132 inclined about 25° to the horizontal, toward the shackle line. The primary frame is reciprocated along the rails by a pair of crank arms 134 affixed to opposite ends of a torque tube 136. One of the arms is driven by a hydraulic cylinder attached to the stationary frame 140 of the eviscerator.

Each puller includes a "spoon" 142 (FIGS. 10–12) having a long handle 144 and a downwardly concave head comprising a pair of fingers 146,148 whose tips hook downward slightly. One of the fingers 148 has a pivot connection to the body of the spoon, so that it can open and close horizontally to perform a grasping action. The spoon also has a broad metal flapper 150 which is normally closed vertically against the bottom of the fingers, but can be swung open to a position perpendicular to the fingers. Pushrods 152,154, operated by mechanisms not shown in detail, produce the described movements. The pushrods are operated by respective hydraulic cylinders at opposite ends of the frame.

The primary frame is associated with a fixed cam slot in an end piece of the device, which causes the spoons to follow an irregular path into the bird, consistent with the geometry of the top of the cavity. The slot is substantially wider than a roller which follows the contour of the slot, alternatively in engagement with either its upper or lower boundary. The roller is mounted at the end of a lever, which is toggled—at the extremes of spoon displacement—between upper and lower positions by an air cylinder. The cylinder is operated so that the spoon enters the cavity high, and exits the cavity low, along a path substantially parallel to, but about an inch below, the entry path.

Above and behind the bird is a pressure plate, shaped to conform to the shape of the breast, and mounted at the upper end of a four-bar linkage that is mechanically actuated by a connecting rod, the outer end of which is pinned to one of the crank arms that drive the primary frame. The purpose of the pressure plate it to apply force to the chest of the bird, to control its position so that, regardless of variations in bird size, the spoon will enter the cavity, as it must, above the stomach and heart. Proper evisceration will not otherwise result. The connecting rod pivots the pressure plate downward, about its mounting point on the main frame. Small air cylinders between extensions on two of the links alter the horizontal position of the plates.

A secondary frame 174 is mounted on the primary frame. It has rails 176, parallel to and inboard of the primary rails, which ride on V-groove wheels 178, each coaxial with one of the primary wheels. The secondary frame is extended by an air cylinder, which acts as a large, constant rate spring. Parallel movement of both ends of the secondary frame is ensured by means of racks fixed to the secondary frame's rails. Pinions on a common shaft are in constant mesh with the racks so that the ends of the secondary frame are constrained to move equally, maintaining parallelism between the frames even when some birds are missing at the station (and there is consequent unequal loading). The secondary frame has pairs of vertical rods 186 (FIG. 10)— bent slightly outward at their upper ends—affixed to it, to keep the birds from being pulled out of position by the spoon. High-pressure water nozzles are provided between the vertical rods for cleaning the spoons between cycles.

In operation, birds are carried into the eviscerator station and dwell in front of the respective spoons. As the primary frame is advanced, each spoon enters the abdominal opening of a respective bird, going in above the stomach and heart to the neck end of the cavity. The vertical position of the frame is then shifted, driving the spoon tips downward. At the same time, the fingers are opened and closed to capture the esophagus and proventriculus (which leads to the crop or gullet). Then, the flapper is deployed downward, forming a barrier which pushes the viscera before it. There is a slot in the flapper to receive the proventriculus, so that it is not severed. The spoon is retracted by movement of the primary frame.

The intestines are not well attached to the cavity, and generally fall out onto a fixed vacuum receiver 190 comprising a trough 192 having a large tubular handle 194 at its midpoint. The handle is connected to a source of vacuum, so lo that the intestines are sucked away, but the trough is designed not to admit the "package" of organs (heart, liver, spleen, gizzard) which must be retained for visual inspection by a USDA inspector. According to this design, the trough has a deep vee (with a large dihedral angle), with wings 196 extending outward from the tops of the arms of the vee. The dihedral angle between the wings is much lower than for the vee, and the gap between the ends of the vee is narrow, about half an inch. The desirable organs are too large to enter the gap, which is open at the ends, so that the vacuum produces an inward draft which draws the intestines towards and into the tubular handle.

Inspection

After the eviscerating cycle is complete, the cars resume continuous movement, and enter the inspection station. Here, there is an additional oval track 198 (FIG. 2), much shorter than the first, below and parallel to the long track. Except for its length, it is identical to the long track, and supports a series of cars 199 like those described above, except that they are all connected in an endless band by articulated links.

Through the inspection station, the upper and lower cars move at the same, equal speeds, displaying the opened bird cavity and the organ package to the inspector, so that he can make a thorough inspection. It may not be necessary for the inspector to touch each bird. Rejected birds are removed from the line; the remainder pass to the final preparation station where the cars dwell while an inside wash and vacuum is done.

Final preparation

At the final preparation station, the each bird's cavity is entered by a two irrigation and suction implements. The lower is a suction head 200 specifically designed to remove any remaining lung or other tissue, and the kidneys, from the back side of the cavity. The upper is a cylindrical probe 202 having high-pressure water jets for irrigating the entire cavity and a vacuum clamping device for capturing and removing the crop, if it avoided removal by the eviscerator.

Ten suction heads are pivotally mounted on a common first beam 204. Normally in a horizontal position defined by a stop, each head can pivot upward against the action of a compression spring 206 acting on a pull rod, independently of the other heads, to follow irregularities in the cavity. Each suction head has a pair of oval apertures 208, each about one inch long by a half inch wide. The apertures are about 3/8" apart, and a groove 210 is formed in the head between the apertures, to center the head over the backbone. Vacuum is applied to the apertures only on the retract stroke, while jets of water from an 800 psi source exit downward through 0.030" diameter nozzles 212, one in each aperture.

The beam 204 is part of a frame 214 riding on inclined rails 215, as with the eviscerator, and the ten probes are supported on a second beam 216 which can be moved with respect to the frame by a stationary cam slot and a lever arm having a follower which rides in the slot. The frame is, like the primary frame in the eviscerator, reciprocated by means of a crank and connecting links, the crank comprising a pair of arms 224 interconnected by a torque tube 226. One of the arms is driven fore and aft by a hydraulic cylinder.

The body of each probe 202 is a long cylindrical one-inch diameter tube 230 having a hemispherical nose 232 provided with six to ten 0.040" diameter nozzles 234, which eject water in all forward directions to clean the cavity and loosen any remaining tissues. The tube is supported by a yoke 236 on the second beam, so that its elevation can deflect upward about 10° from its horizontal rest position, which is defined by a stop on a hanger 238 forward of the pivot point. A tension spring 240 behind the pivot point tends to keep the tube in the horizontal position. The tube interior is connected to a vacuum manifold, not shown The hemispherical nose is supported at the end of a long rod 242, passing through the tube, and driven by a small air cylinder at the rear of the tube. Although normally retracted to provide an unbroken surface with the tube, the nose can be advanced by means of the rod to expose the open end of the tube. When the nose advances, tissues in its vicinity, desirably the proventriculus, are then pulled by the vacuum into the tube. As the nose is retracted, the tissue is clamped between the nose and the end of the tube. With tissue thus clamped, the probe is driven further forward, through the neck opening, so that it extends about eight inches out of the bird. By now, any connecting tissues have been broken, and as the nose is once more advanced, the tissues are released and pulled by vacuum into the tube, thence carried away to an appropriate disposal facility. Alternatively, the probe could simply drop the removed tissues by closing off vacuum before the nose was advanced outside of the bird. Either way, the probe is finally fully withdrawn out of the bird.

Unloading

After the final cleanup procedure, the cars are reaccelerated, passing through the unloading station where the wing clamps are lowered so that the inspected, eviscerated birds may be removed (manually, or by machinery not shown) for further processing.

Since the invention is subject to modifications and variations, it is intended that the foregoing description and the accompanying drawings shall be interpreted as illustrative of only one form of the invention, whose scope is to be measured by the following claims.

What is claimed is:

1. An apparatus for transporting poultry and the like through one or more processing stations, said apparatus comprising a track defining an endless pathway, a plurality of cars adapted to move along said pathway, at least one auger located along at least a portion of said pathway having an axis of rotation parallel to said portion of said pathway for moving at least some of said cars along said pathway, at least some of said cars having a follower engaged by said auger as it rotates, said auger being driven at a constant speed to accelerate, decelerate or drive said cars at a constant speed along said track based on a location of said cars along said track, said auger has a portion of uniform pitch for moving said cars at the constant speed, and a portion of varying pitch for accelerating and decelerating said cars within a processing station, and means for stopping said cars intermittently at another part of said pathway.

2. The invention of claim 1, wherein said apparatus comprises a frame, and said track is a monorail following a horizontal oval path around said frame.

3. The invention of claim 2, wherein each of said cars has a plurality of wheels whose periphery engages and conforms to the shape of said monorail so as to grasp said monorail and prevent said cars from pitching or rolling as they move.

4. The invention of claim 1, wherein said cars are arranged in groups of N cars each, N being a positive integer greater than one, all cars within each group being interconnected by hinged couplers, and only every Nth car having a follower for engaging the auger.

\* \* \* \* \*